(12) United States Patent
Johns et al.

(10) Patent No.: US 8,184,296 B2
(45) Date of Patent: May 22, 2012

(54) EMISSIONS MONITORING APPARATUS, SYSTEM, AND METHOD

(75) Inventors: Robert G. Johns, Virginia Beach, VA (US); Reginald L. Viray, Virginia Beach, VA (US); Edward P. Weaver, Virginia Beach, VA (US); Nathan J. Lundin, Virginia Beach, VA (US); Megan Jones, Virginia Beach, VA (US)

(73) Assignee: W R Systems, Norfolk, VA (US)

( * ) Notice: Subject to any disclaimer, the term of this patent is extended or adjusted under 35 U.S.C. 154(b) by 293 days.

(21) Appl. No.: 12/633,156

(22) Filed: Dec. 8, 2009

(65) Prior Publication Data

US 2010/0206042 A1 Aug. 19, 2010

Related U.S. Application Data

(60) Provisional application No. 61/202,319, filed on Feb. 18, 2009.

(51) Int. Cl.
*G01N 21/00* (2006.01)
(52) U.S. Cl. ........................................ 356/437; 73/23.31
(58) Field of Classification Search .......... 356/437–440; 73/114.71, 23.31
See application file for complete search history.

(56) References Cited

U.S. PATENT DOCUMENTS

| | | | |
|---|---|---|---|
| 5,709,082 A | 1/1998 | Harris et al. | |
| 5,794,605 A | 8/1998 | Kato | |
| 6,079,251 A | 6/2000 | Gaultier et al. | |
| 6,192,738 B1 | 2/2001 | Stahl et al. | |
| 6,299,496 B1 | 10/2001 | Griffiths et al. | |
| 6,732,031 B1 | 5/2004 | Lightner et al. | |
| 6,732,032 B1 | 5/2004 | Banet et al. | |
| 6,959,590 B2 | 11/2005 | Hendren et al. | |
| 6,960,476 B2 | 11/2005 | Morris | |
| 7,314,044 B2 | 1/2008 | Westerbeke | |
| 7,434,449 B2 | 10/2008 | Kusaka et al. | |
| 7,926,332 B2 * | 4/2011 | Yamakage et al. | 73/114.71 |
| 2004/0200265 A1 * | 10/2004 | Eden et al. | 73/23.31 |
| 2005/0165518 A1 | 7/2005 | Reynolds et al. | |

(Continued)

FOREIGN PATENT DOCUMENTS

WO 2008096939 A1 8/2008

OTHER PUBLICATIONS

Consilium Emission Monitoring System, "Emission Monitoring System", www.naval-technology.com/contractors/navigation/consilium/.
Environmental Defense Fund, "Floating Smokestacks", 2008.

*Primary Examiner* — Layla Lauchman
(74) *Attorney, Agent, or Firm* — Squire Sanders (US) LLP

(57) ABSTRACT

Some embodiments of the invention generally relate to an apparatus configured to monitor emissions. The apparatus includes a sampling chamber, a gas analyzer, and a particulate matter analyzer. The sampling chamber is configured to receive a portion of an exhaust flow from an exhaust stack. The portion of the exhaust flow comprises one or more gases and particulate matter. The gas analyzer is configured to receive the portion of the exhaust flow to measure at least one emission level of the one or more gases using a laser and output a signal indicative thereof. The particulate matter analyzer is operatively connected to the sampling chamber and is configured to measure the particulate matter using optics and output a signal indicative thereof.

49 Claims, 18 Drawing Sheets

U.S. PATENT DOCUMENTS

| | | |
|---|---|---|
| 2007/0137514 A1 | 6/2007 | Kumar et al. |
| 2007/0219683 A1 | 9/2007 | Daum et al. |
| 2008/0082223 A1 | 4/2008 | Daum et al. |
| 2008/0125924 A1 | 5/2008 | Daum et al. |
| 2009/0293646 A1* | 12/2009 | Johnson et al. ............ 73/863.22 |
| 2011/0045422 A1* | 2/2011 | Tanca .............................. 431/76 |

* cited by examiner

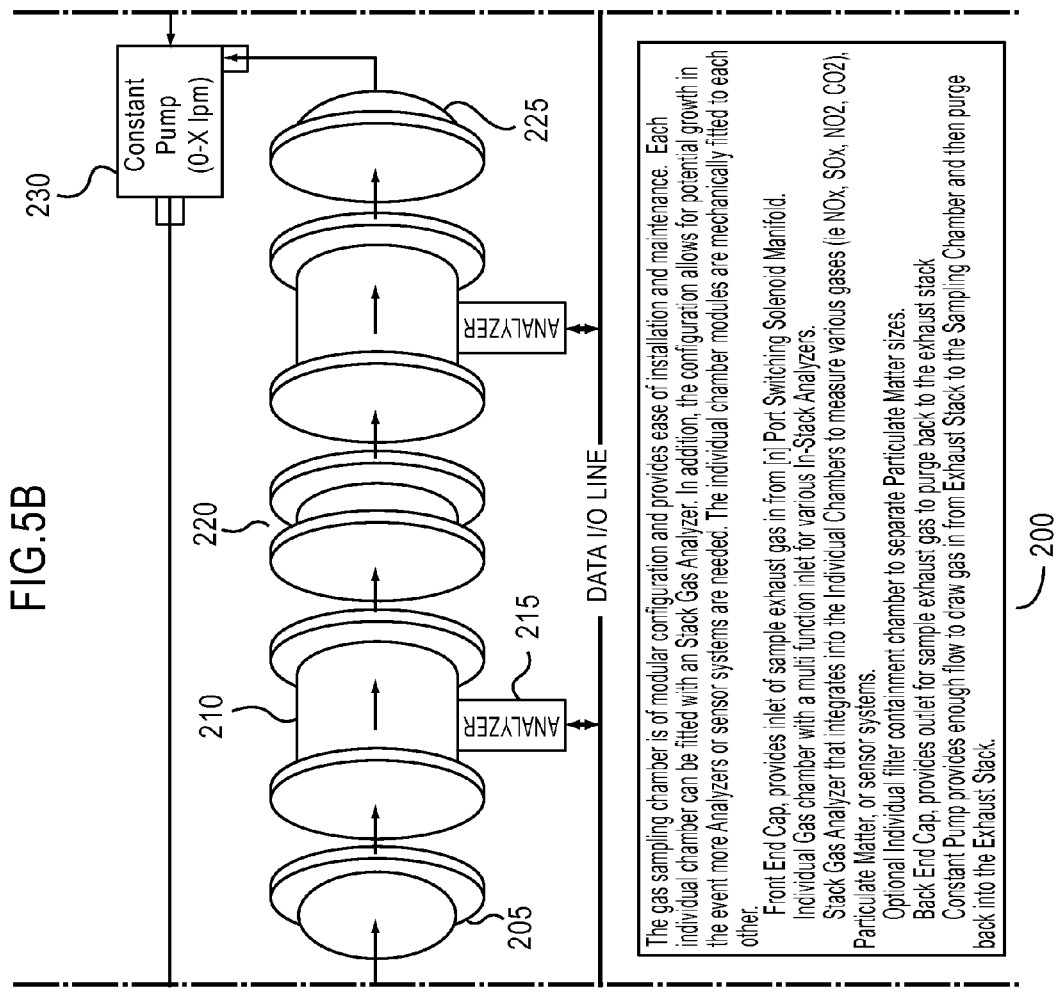

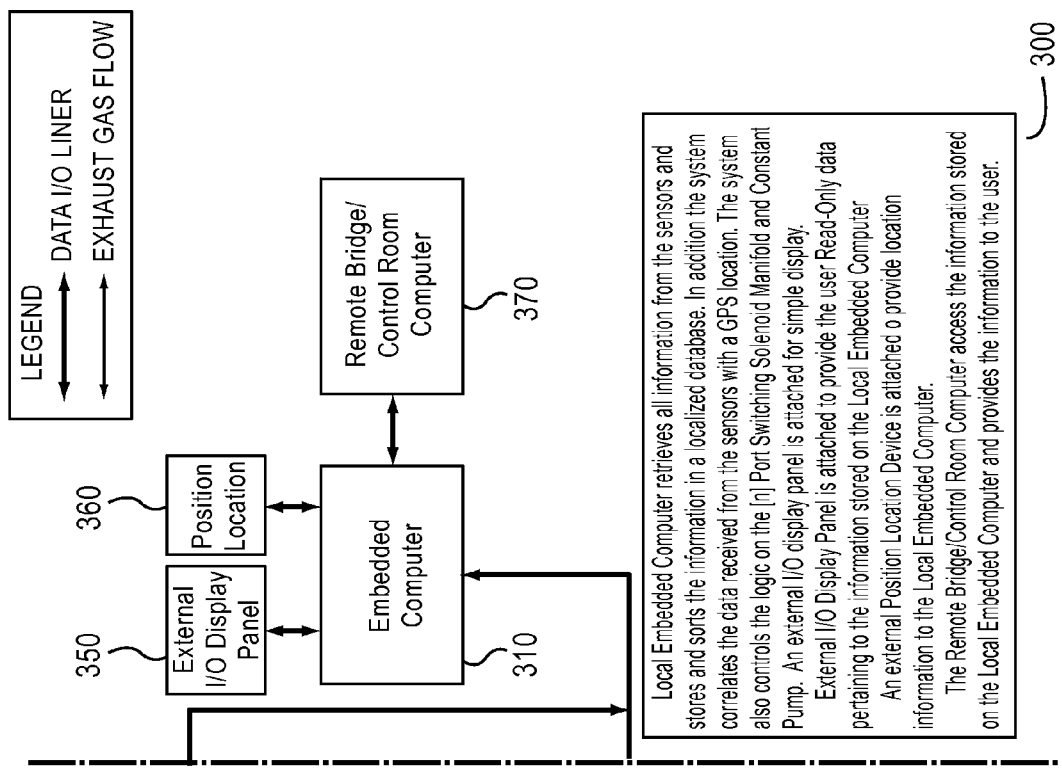

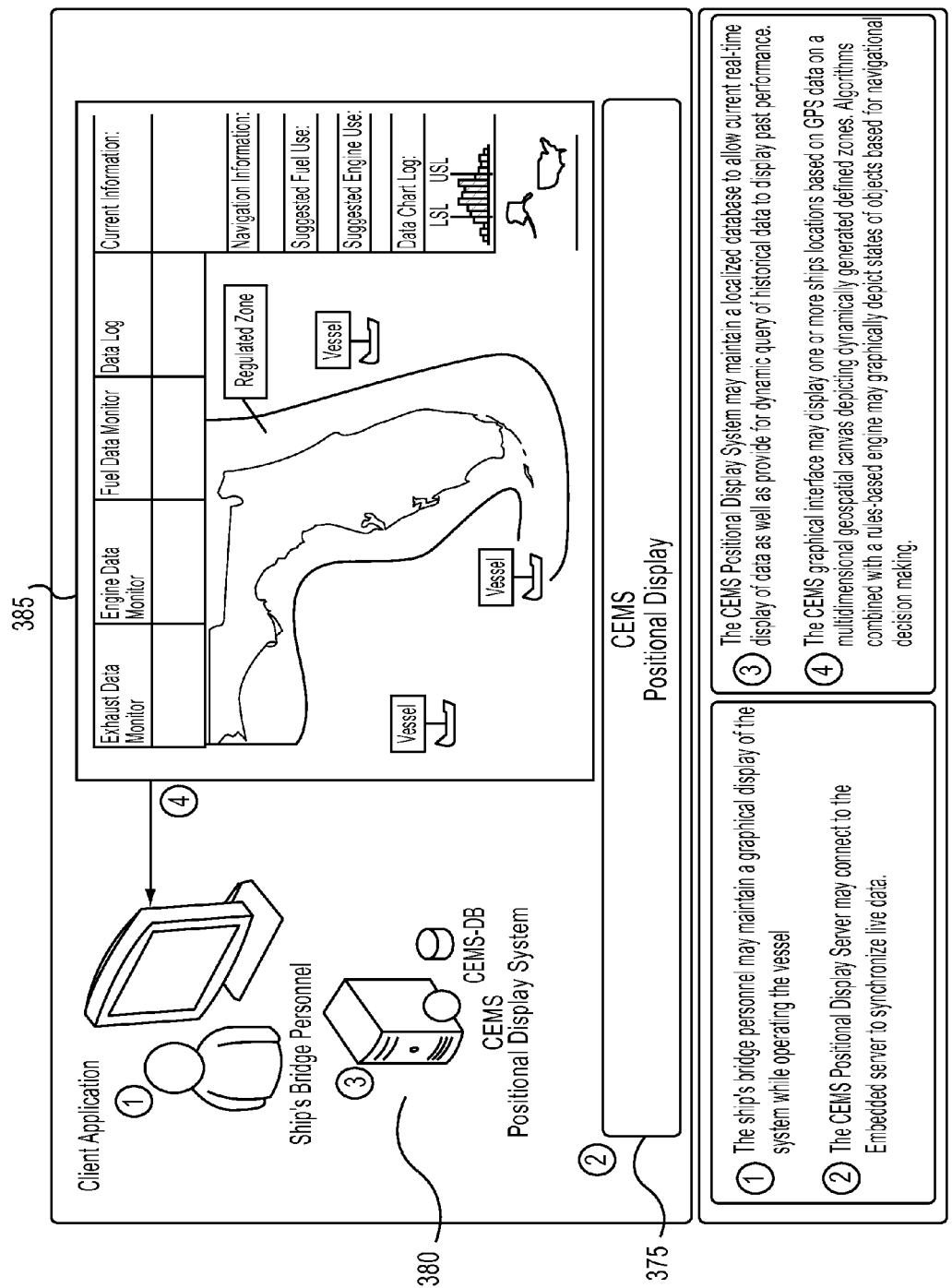

FIG.13

| Exhaust Data Monitor | Engine Data Monitor | Fuel Data Monitor | Data Log | Current Information: |
|---|---|---|---|---|
| NOx Readings: [ ]<br>SOx Readings: [ ]<br>PM Readings: [ ] | Engine Lead: [ ]<br>Engine Efficiency: [ ]<br>Cylinder Pressure: [ ]<br>Air Pressure: [ ]<br>RPM: [ ]<br>Injection Pressure: [ ] | FUEL TANK 1:<br>Fuel Type: [ ]<br>Sulfur Content: [ ]<br>FUEL TANK 2:<br>Fuel Type: [ ]<br>Sulfur Content: [ ] | 03/11/2012<br>03/10/2012<br>03/09/2012<br>03/08/2012<br>03/07/2012<br>03/06/2012 | CURRENT REGULATIONS:<br>NOx Limits: [ ]<br>SOx Limits: [ ]<br>PM Limits: [ ] |

REGULATED ZONE
U.S. EPA - State of Florida
Standards: [ ]
Message Must Transmit Log Data Current Location REGULATORY LOCATION:
Operating Region: [ ]
Regulatory Codes: [ ]

Navigation Information:

GPS Location: [ ]
Trajectory: [ ]

Suggested Fuel Use:

TANK 1: [ ]
Trajectory: [ ]

Suggested Engine Use:

Engine Load: [ ]
Engine Efficiency: [ ]

Data Chart Log:

LSL    USL

FIG.15

| Exhaust Data Monitor | Engine Data Monitor | Fuel Data Monitor | Data Log | Current Information: |
|---|---|---|---|---|
| NOx Readings: [ ]<br>SOx Readings: [ ]<br>PM Readings: [ ] | Engine Lead: [ ]<br>Engine Efficiency: [ ]<br>Cylinder Pressure: [ ]<br>Air Pressure: [ ]<br>RPM: [ ]<br>Injection Pressure: [ ] | FUEL TANK 1:<br>Fuel Type: [ ]<br>Sulfur Content: [ ]<br>FUEL TANK 2:<br>Fuel Type: [ ]<br>Sulfur Content: [ ] | 03/11/2012<br>03/10/2012<br>03/09/2012<br>03/08/2012<br>03/07/2012<br>03/06/2012 | CURRENT REGULATIONS:<br>NOx Limits: [ ]<br>SOx Limits: [ ]<br>PM Limits: [ ]<br><br>REGULATORY LOCATION:<br>Operating Region: [ ]<br>Regulatory Codes: [ ]<br><br>Navigation Information:<br><br>GPS Location: [ ]<br>Trajectory: [ ]<br><br>Suggested Fuel Use:<br><br>TANK 1: [ ]<br>Trajectory: [ ]<br><br>Suggested Engine Use:<br><br>Engine Load: [ ]<br>Engine Efficiency: [ ]<br><br>Data Chart Log: |

REGULATED ZONE
U.S. EPA - State of Florida
Standards: [ ]
Message Must Transmit Log Data Vessel Vessel Vessel

LSL   USL

EMISSIONS MONITORING APPARATUS, SYSTEM, AND METHOD

FIELD

The invention relates generally to an emission monitoring apparatus, system, and method. More specifically, the invention relates to an apparatus, system, and method for monitoring emission.

BACKGROUND

Oceangoing vessels, vehicles, aircrafts, industrial facilities, oil rigs, and oil platforms, for example, are major contributors to increasing global air pollutions. In particular, oceangoing vessels including container ships, tankers, and cruise ships are a major contributor to increasing global air pollution. Engines of these ships are designed to burn the cheapest and lowest quality fuel available. For example, these ships burn fuel such as "bottom of the barrel" heavy fuel oil (HFO). Because HFO is like a tar, it needs to be pre-heated to lower its viscosity to facilitate pumping to the engine for ignition.

Exhaust emission constituents from this HFO may include particulate matter (PM), oxides of nitrogen (NOx), sulfur oxide (SOx), and carbon dioxide ($CO_2$). Since each one of these gases has an adverse effect on both human beings and global atmosphere, there are regulatory rules that require, for example, the oceangoing vessels to operate under certain emission levels. However, there is a need to efficiently monitor the emissions from the oceangoing vessels to enable auditors to access the data to determine whether the oceangoing vessels are in compliance with the emissions regulations of that territory or territories.

SUMMARY

According to one embodiment of the invention, an apparatus is configured to monitor emissions. The apparatus includes a sampling chamber, a gas analyzer, and a particulate matter analyzer. The sampling chamber is configured to receive a portion of an exhaust flow from an exhaust stack. The portion of the exhaust flow comprises one or more gases and particulate matter. The gas analyzer is configured to receive the portion of the exhaust flow to measure at least one emission level of the one or more gases using a laser and output a signal indicative thereof. The particulate matter analyzer is operatively connected to the sampling chamber and is configured to measure the particulate matter using optics and output a signal indicative thereof.

According to another embodiment of the invention, an apparatus is configured to monitor emissions of an engine. The apparatus includes a processor configured to receive and process data associated with a plurality of gases, particulate matter, and an engine state. The processor is also configured to process a time the data is received, and generate a report, based on the processed data, indicative of a concentration level for each emitted gas, a concentration level of the particulate matter, and the engine state. The apparatus includes a transmitter configured to transmit an alert when the concentration level of one of the gases exceeds a predetermined gas level, or when the concentration level of the particulate matter exceeds a predetermined particulate matter level.

According to another embodiment of the invention, a method includes receiving, at a sampling chamber, a portion of an exhaust flow from an exhaust stack. The portion of the exhaust flow comprises one or more gases and particulate matter. The method includes receiving, at a gas analyzer, the portion of the exhaust flow to measure at least one emission level of the one or more gases using a laser and outputting a signal indicative thereof. The method includes measuring, by a particulate matter analyzer, the particulate matter using optics and outputting a signal indicative thereof.

According to another embodiment of the invention, a method for monitoring emissions of an engine includes receiving and processing data associated with a plurality of gases, particulate matter, and an engine state, and processing a time the data is received. The method includes generating a report, based on the processed data, indicative of a concentration level for each emitted gas, a concentration level of the particulate matter, and the engine state. The method includes transmitting an alert when the concentration level of one of the gases exceeds a predetermined gas level, or when the concentration level of the particulate matter exceeds a predetermined particulate matter level.

According to another embodiment of the invention, a computer readable medium is encoded with a computer program. The computer program, when executed, is configured to control a processor to receive and process data associated with a plurality of gases, particulate matter, and an engine state. The processor also processes a time the data is received, and generates a report, based on the processed data, indicative of a concentration level for each emitted gas, a concentration level of the particulate matter, and the engine state. The processor also transmits an alert when the concentration level of one of the gases exceeds a predetermined gas level, or when the concentration level of the particulate matter exceeds a predetermined particulate matter level.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only some embodiments of the invention and are not therefore to be considered to be limiting of its scope, the invention will be described and explained with additional specificity and detail through the use of the accompanying drawings, in which:

FIGS. 5A-5C illustrate a functional system flow diagram of an emissions monitoring system, in accordance with some embodiments of the invention.

FIG. 6 is an illustration of a computer system in a remote bridge/control room of an exhaust data processing system, in accordance with an embodiment of the invention.

FIG. 13 is an illustration of a graphical user interface, in accordance with some embodiments of the invention.

FIG. 15 is an illustration of a similar graphical user interface, as shown in FIG. 13, in accordance with an embodiment of the invention.

DETAILED DESCRIPTION OF THE EMBODIMENTS

It will be readily understood that the components of the invention, as generally described and illustrated in the figures herein, may be arranged and designed in a wide variety of different configurations. Thus, the following more detailed description of the embodiments of the apparatus, system, and method of the invention, as represented in the attached figures, is not intended to limit the scope of the invention, as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

Although the specification is describing the present embodiments as being implemented on an oceangoing vessel, a person of ordinary skill in the art would clearly appreciate that the embodiments described below may be implemented on an engine of a vehicle, aircraft, manufacturing facility, oil platforms, oil rigs, power plants, generators, or any entity that may necessitate measurement of emission threshold and a determination of whether the emissions are in compliance as described herein.

Figure 1:
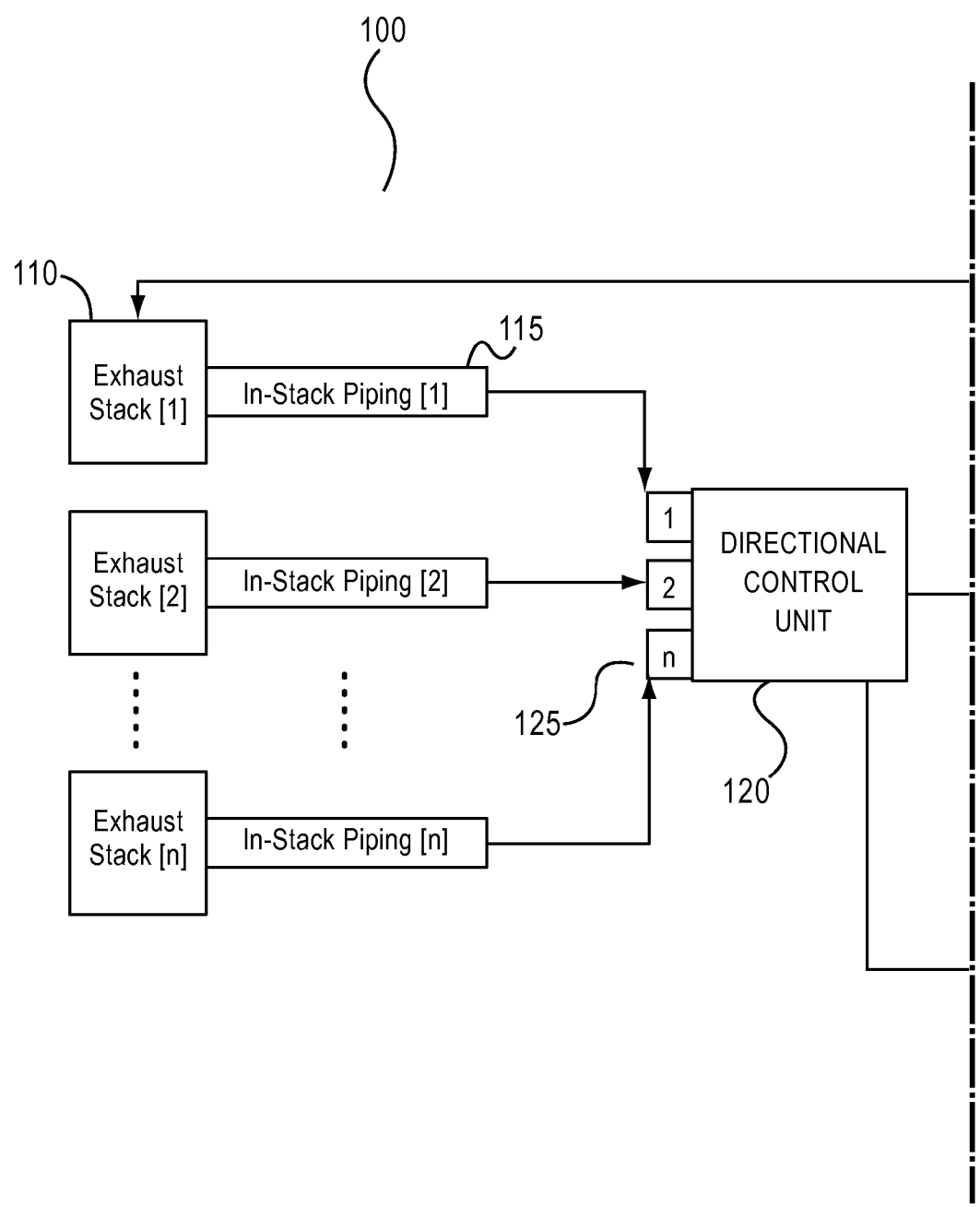
FIG. 1 is an illustration of an exhaust extraction system, in accordance with an embodiment of the invention.

FIG. 1 illustrates an exhaust extraction system 100 in accordance with an embodiment of the invention. The exhaust extraction system includes at least one an exhaust stack or outlet 110 and a directional control unit 120. The exhaust outlet 110 and the directional control unit 120 may be implemented in an oceangoing vessel (not shown). The exhaust outlet 110 includes at least one of an in-stack probe or in-stack piping 115, and the directional control unit 120 includes at least one port 125. The number of ports 125 of the directional control unit 120 depends on the number of exhaust outlets 110. The exhaust outlet 110 may be connected to the directional control unit 120 via the in-stack probe 115 and the port 125, as shown in FIG. 1. Such an embodiment allows the in-stack probe 115 and the port 125 to funnel a portion of the exhaust flow from the exhaust outlet 110 to the port switching manifold 120.

Figure 5A:
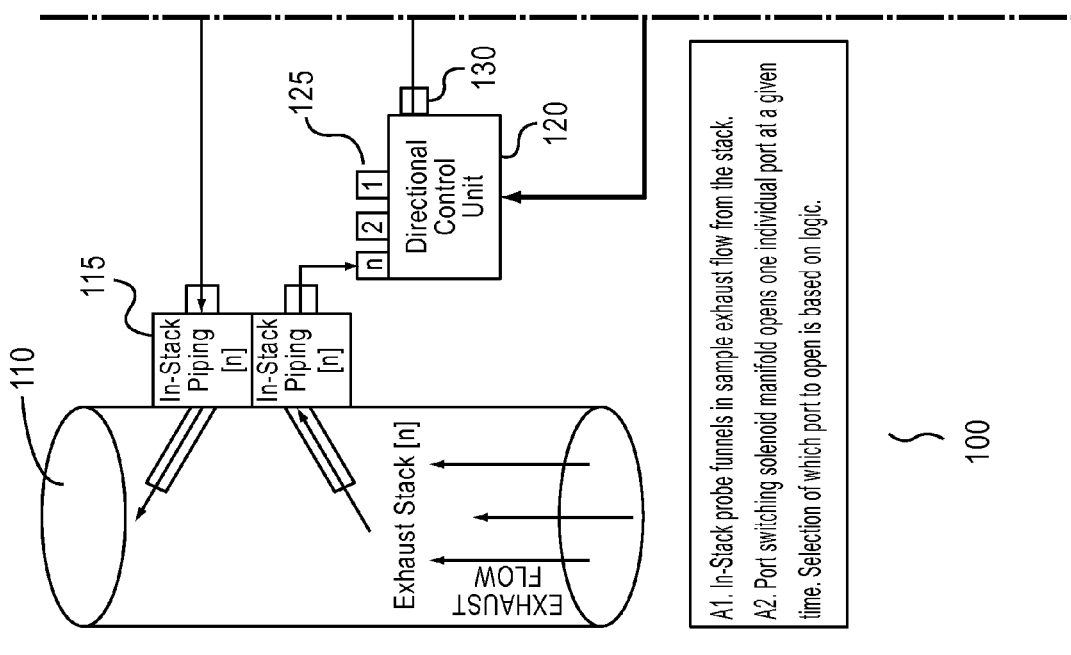

FIG. 1 also shows that the directional control unit 120 may be configured to be connected to an embedded machine via a data input/output (I/O) line. The data I/O line may be a physical link or a wireless link that provides a connection between the directional control unit 120 and an embedded machine 310. The directional control unit 120 also includes a constant pump 130, as shown in FIG. 5A. The constant pump 130 provides draws from the directional control unit 120 to allow the portion of the exhaust flow pass into a sampling chamber 200.

Figure 2:
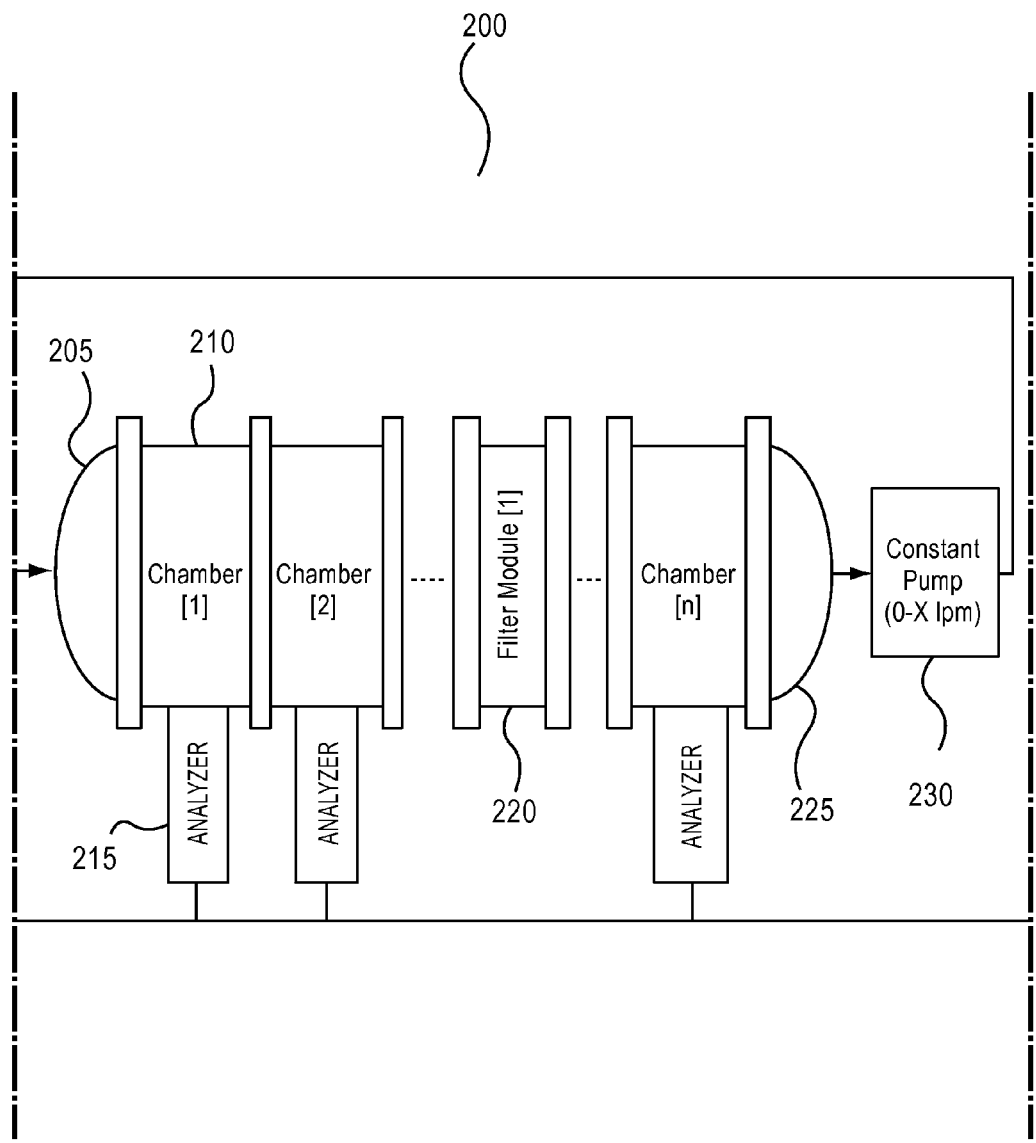
FIG. 2 is an illustration of a sampling chamber, in accordance with an embodiment of the invention.

Referring now to FIG. 2, the sampling chamber 200 is shown, in accordance with an embodiment of the invention. The sampling chamber 200 may include, but is not limited to, a front end cap 205, an individual chamber 210, an analyzer 215, a filter module 220, and a back end cap 225. Each of these components will be discussed in greater detail below. The sampling chamber 200 is coupled to a constant pump 230, so the exhaust flow can be returned back to the exhaust outlet 110.

The front end cap 205 provides an inlet to receive the portion of the exhaust flow from the directional control unit 120. The individual chamber 210 includes a multi function inlet for the analyzer 215. For each type of gas there may be a designated individual chamber 210. For example, the sampling chamber 200 may include an individual chamber 210 for sulfur oxide, an individual chamber 210 for carbon dioxide, an individual chamber 210 for nitrous oxide, an individual chamber 210 for particulate matter, as well as an individual chamber 210 for any other gas or chemical that would be appreciated by a person of ordinary skill in the art. A person of ordinary skill in the art would appreciate that the individual chambers 210 may be known as an emissions chamber(s). It should be noted that, even though each individual chamber 210 is designated for a particular type of gas, various types of gases may flow through each of the individual chambers 210. Furthermore, the gas designated to a particular individual chamber 210 may be the primary gas that is extracted by the analyzer 215.

FIG. 2 also shows that each individual chamber 210 is operatively connected to at least one analyzer 215. The analyzer 215 can be fitted within the individual chamber 210 or outside of the individual chamber 210 or any combination thereof. In this embodiment, the analyzer 215 is configured to measure various extracted gases using laser technology and extracted particulate matter using optical technology. However, it should be noted that the measurement of the gases and the particulate matter may be performed using any technology, for example, chemiluminescence technology, that would be appreciated by a person of ordinary skill in the art. For example, if the analyzer 215 is connected to the individual chamber 210 related to sulfur oxide, then the analyzer 215 is configured to measure the value of the sulfur oxide gas, and does not measure the value of any other gas. However, a person of ordinary skill in the art would appreciate that the analyzer 215 can be configured to measure more than one type of gas in the individual chamber 210. It should be noted that the analyzer 215 is not limited to measuring a value of the gas, but also temperature or any other substance that would be appreciated by a person of ordinary skill in the art. The analyzer 215 also connects to an embedded computer or machine 310 (see FIG. 3) via a data I/O line to transmit data, which will be discussed in greater detail below.

In accordance with the embodiment shown in FIG. 2, the filter module 220 of the sampling chamber 200 is configured to separate particulate matter sizes. The back end cap 225 of the sampling chamber 200 is configured to provide an outlet for the portion of the exhaust flow from the individual chamber 210 to the exhaust outlet 110 via the constant pump 230. The amount of exhaust flow that is returned back to the exhaust outlet 110 is controlled by the constant pump 230 of the sampling chamber 200. The constant pump 230 of the sampling chamber 200 is controlled by the embedded machine 310, as shown in FIG. 3.

It should be noted that the configuration of the sampling chamber 200 may be modular and, as a result, may provide ease with the installation process and maintenance of the sampling chamber 200. In addition, when there are more than one individual chambers 210, each of the individual chambers 210 can be mechanically fitted to each other with or without the filter module 220 placed between each of the individual chambers 210.

Figure 3:
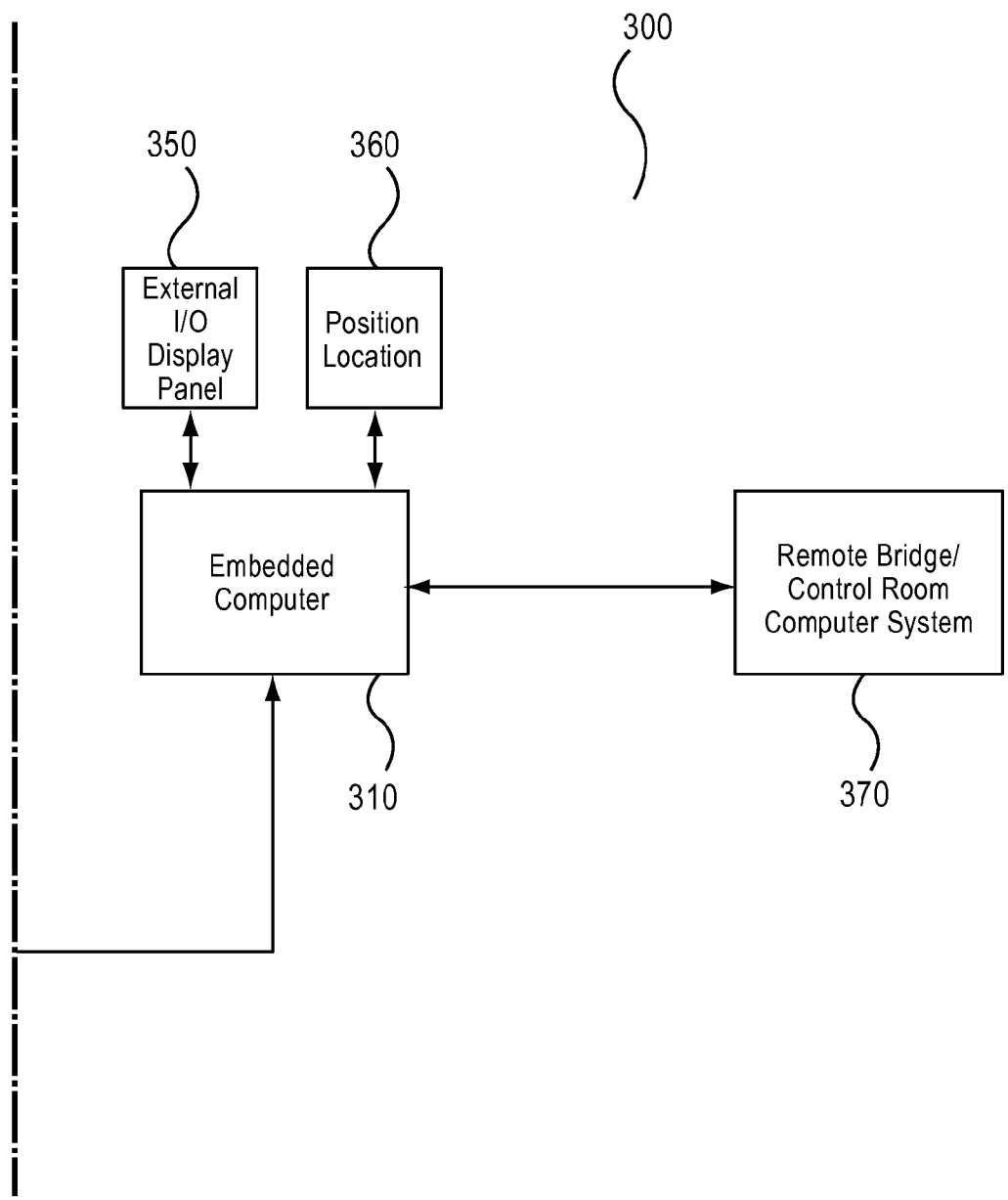
FIG. 3 is an illustration of an exhaust data processing system, in accordance with an embodiment of the invention.

FIG. 3 illustrates an exhaust data processing system 300, in accordance with an embodiment of the invention. The exhaust data processing system 300 may include, but is not limited to, the embedded machine 310, an external input/output (I/O) display panel 350, a position locator (position indicator) 360, and a remote bridge/control room computer system 370. However, a person of ordinary skill in the art would appreciate that the machine 310 may be located either locally or remotely. The embedded machine 310 connects to the external I/O display panel 350, the position indicator 360, and the remote bridge/control room computer 370. This connection can be any type of physical or wireless link. In addition, the embedded machine 310 connects to the sampling chamber 200 through any type of physical or a wireless link. As a result, data can be easily collected from the analyzer(s) 215, which are embedded or adapted to the individual chambers 210.

Figure 4:
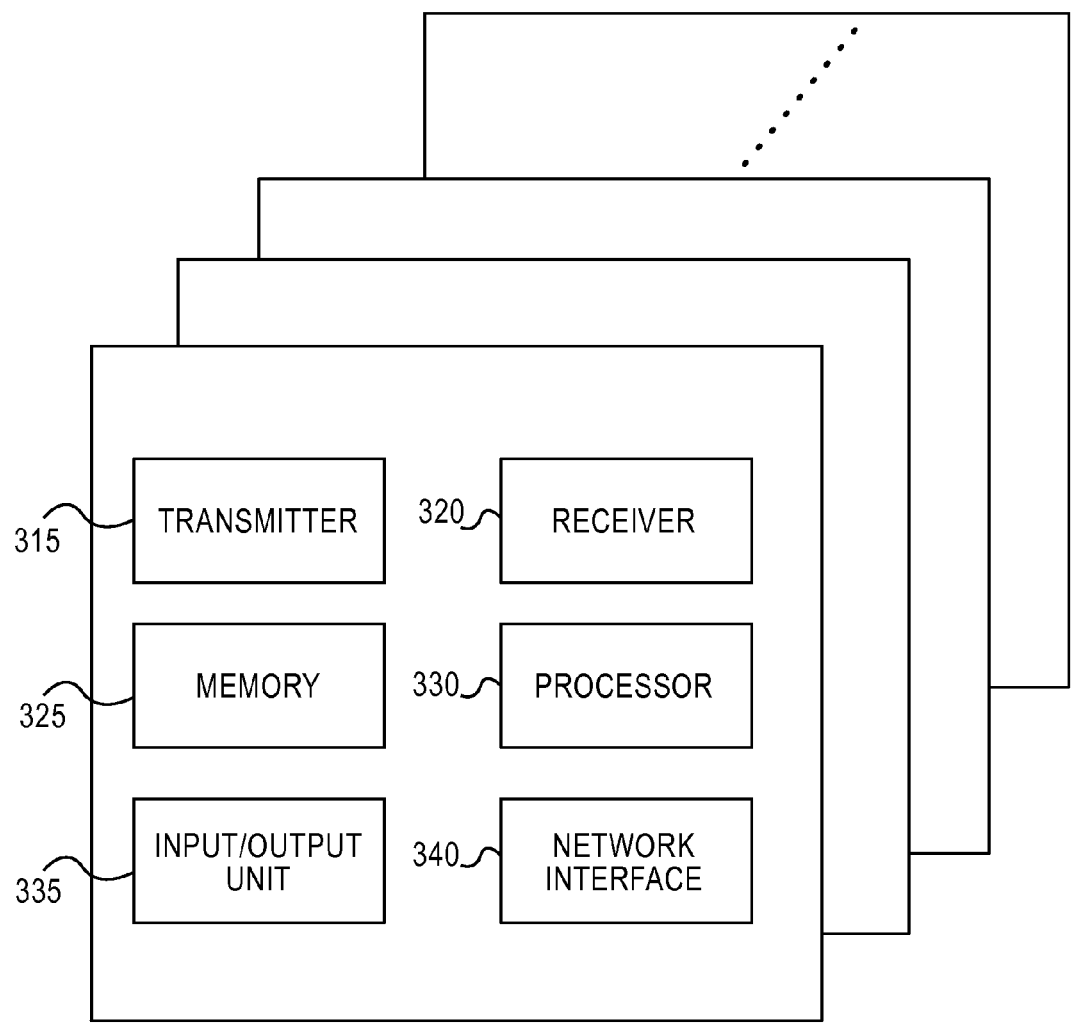
FIG. 4 is an illustration of a computer system, in accordance with some embodiments of the invention.

Referring to FIG. 4, components of the embedded machine 310 and/or remote bridge/control room computer system 370 are shown, in accordance with an embodiment of the invention. However, other components may be included in the embedded machine 310 and/or remote bridge/control room computer system 370 or any other computer system that is readily appreciated by a person of ordinary skill in the art. FIG. 4 illustrates that some of these components include a transmitter 315, a receiver 320, a memory 325, a processor 330, an input/output unit 335, a network card 340, or any other structural component that would be readily appreciated by a person of ordinary skill in the art.

Referring back to FIG. 3, the display panel 350 of the exhaust data processing system 300 can be a liquid crystal display (LCD), a cathode ray tube (CRT) display, or any type of display that would be readily appreciated by a person of ordinary skill in the art.

The computer system 370 of the exhaust data processing system 300 can be located separate from the embedded machine 310. For the purposes of describing this embodiment, the location of the computer system 370 is at any remote bridge/control room of the oceangoing vessel. However, it should be noted that the location of the computer 370 can be any location that would be readily appreciated by the person of ordinary skill in the art. The position indicator 360 is, for example, a global positioning system (GPS) or any other type of positioning system that would be appreciated by a person of ordinary skill in the art. The position indicator 360 may be a standalone device or may be an existing position indicator 360 configured into the oceangoing vessel's system. However, to maintain an open architecture of the system, the position indicator 360 may be a stand alone device, as each oceangoing vessel, can have its own type of position indicator. Because the position indicator may have a National Marine Electronic Association (NMEA) interface, the position indicator may be easily adapted to the emissions control system discussed herein.

The operations of each of these components will be discussed in further detail below.

FIGS. 5A-5C illustrate a functional flow diagram of the exhaust extraction system 100, the sampling chamber 200, and the exhaust data processing system 300, in accordance with an embodiment of the invention. When exhaust flow (e.g. gas(es) and/or particulate matter) is emitted from an oceangoing vessel, the exhaust flow is released out of the exhaust outlet 110. As the exhaust flow is released, a portion of the exhaust flow is funneled from the exhaust outlet 110 to the in-stack probe 115. The in-stack probe 115 then funnels the portion of the exhaust flow to a directional control unit 120. The directional control unit 120 receives the exhaust flow funneled from the in-stack probe 115 via a port 125. The directional control unit 120 can open one or more ports 125 at any given time. The selection of which port 125 to open is based on information gathered at the embedded machine 310. The directional control unit 120 and the embedded machine 310 are connected by any type of data input/out (I/O) line that would be appreciated by a person of ordinary skill in the art.

When the given port 125 or ports 125 are open, the directional control unit 120 receives the portion of the exhaust flow funneled from the exhaust outlet 110. The portion of the exhaust flow is then transferred from the directional control unit 120 to the sampling chamber 200.

In the sampling chamber 200, analysis of the gas is conducted, as will be discussed below. Once the front end cap 205 of the sampling chamber 200 receives the portion of the exhaust flow from the directional control unit 120, the portion of the exhaust flow is transferred through one or more individual chambers 210. The portion of the exhaust flow is transferred through one or more individual chambers 210, because the constant pump 230 of the sampling chamber 200 draws gas from the directional control unit 120. The number of individual chambers 210 depends upon the number of gases and/or particulate matter that makes up the portion of the exhaust flow. As discussed above, for each type of gas there may be corresponding individual chambers 210. For example, in the case that there are three types of gas (e.g. NOx, SOx, and CO2) that make up a portion of the exhaust flow, there may be three individual chambers 210 for the three types of gases and an individual chamber 210 for the particulate matter.

Furthermore, because each individual chamber 210 is equipped with at least one analyzer 215, the type of gas for the corresponding chamber 210 is analyzed using laser technology accordingly. In addition, the at least one analyzer 215 analyzes the particulate matter in a corresponding chamber 210 using optics. As a result, the analyzers 215 analyze the gas and collect data related to the gas, as well as analyze the particulate matter and collect data related to the particulate matter.

As the portion of the exhaust flow passes through one or more individual chambers 210, the data related to each type of gas is collected from the corresponding individual chambers 210. The data collected may be considered as raw data or processed data and may be measured as parts per million, as will be discussed below. In one embodiment of the invention, raw data may be the actual data collected from the individual chamber(s) 210 without processing the data. In another embodiment of the invention, each analyzer 215 may collect the data related to the particular gas. The analyzer 215 may then analyze the concentration level of the gas and may depict the concentration level of the gas as data in parts per million. This process of collecting and analyzing may be considered as processed data.

As gas and particulate matter is analyzed, the portion of the exhaust flow may continue to flow to the back end cap 225 of the sampling chamber 200. The embedded computer or machine 310 may be configured to control the constant pump 230 and return the portion of the exhaust flow back to the exhaust outlet 210. It should be noted that the portion of the exhaust flow that was sampled may be returned back to the exhaust outlet 110 from the constant pump 230 via the in-stack probe 115. The in-stack probe 115 may be the same probe that transferred the portion of the exhaust flow from the exhaust outlet 110 to the directional control unit or may be a separate in-stack probe 115 configured to pull the portion of the exhaust flow from the back end cap 225 of the sampling chamber 200, as illustrated in FIG. 5B.

Once the data related to the types of gas or gases and particulate matter is collected by each analyzer 215, the embedded computer or machine 310 retrieves or receives the data from each analyzer 215. As discussed above, the data is retrieved or received, for example, by the embedded machine 310 via the data I/O line. The input/output line operatively connects the analyzer 215 to the embedded machine 310 either physically (hardwired) or wirelessly. The configuration allows the embedded machine 310 to store the data retrieved or received from the analyzer 215 in a datastore. In addition, other information, such as position data of the vessel may also be stored in the datastore. After the data and any other information that would be appreciated by a person of ordinary skill in the art is stored in the datastore, the data as well as the other information is sorted in the datastore. In another embodiment of the invention, the data and any other information is stored and sorted simultaneously in the datastore.

The datastore in the memory 325 (see FIG. 4) may include at least one of the following fields: a data field, monitored parameter field, a standard emissions requirement field, a monitored component field, a current state field, a location information (or position data) field, company name, owner, driver, name, type, stack count, engine name, identifier of a main engine, identifier of an auxiliary engine (1 . . . n), fuel type, fuel used, agent, inspector, last inspection, date, version of emissions standards, last emissions standard, update emissions standard comments, device name, device identification, device manufacturer, device version, device calibration, last date, device value, date (current date for logging data), time (current time for logging data), latitude, longitude, last location name, last location, calibrator, speed, wind, zone/region, rotation per minute, thrust, sea state, altimeter, temperature of air and/or sea, meteorological condition, mile marker, system last report, system last reboot, system backup, or any other type of data that may be appreciated by a person of ordinary skill in the art.

Once the data collected from the respective analyzers 215 is stored and sorted in the datastore, the data is correlated with the position data of the vessel. However, a person of ordinary skill in the art would appreciate that the collection and correlation may occur simultaneously. Because the data related to the type of gas being monitored is correlated with the position data of the vessel, the embedded machine 310 is able to compare the vessels current emissions level against the standard emissions requirement of a zone the vessel is currently located in. The zone is defined as, for example the geographical location of the area, zone, or country in which the vessel is located in.

Furthermore, the standard emissions requirement may be a threshold logic rule(s) defined by regulatory emissions agencies. This threshold logic rule(s) can be inputted by the user into the embedded mechanism 310 or automatically downloaded into the embedded mechanism 310. An automatic download is performed without external or human control or intervention. For example, an automatic download occurs during system initialization or when the vessel enters a geographical location where a download is required. If the standard emissions requirement is automatically downloaded into the embedded mechanism 310, then the download is initiated by a condition set by the user or by the provider who provides the download of standard emissions requirement to the embedded mechanism 310. The automatic update of the standard emissions requirement can also be updated automatically based upon the geographical location of the vessel. An automatic update is an update performed without external or human control or intervention. For example, as the vessel is nearing the zone of the United States (see FIG. 6), the standard emissions requirement is downloaded from a server of the provider of the standard emissions requirement. It should be noted that the download/update of the standard emissions requirement is not be limited to the above-mentioned conditions, but instead the standard emissions requirement is download/updated by any method or process that would be appreciated by a person of ordinary skill in the art. Furthermore, the threshold logic rule(s) is based on zone requirements for specific emission containment areas and/or emission control areas. This configuration allows the threshold logic rule(s) to alarm a vessel when the gas levels or the particulate matter levels are above a threshold level for a particular zone the vessel is in.

As the embedded machine 310 correlates the data retrieved or received from analyzer 215 with the position data of the vessel obtained from the position local device 360 and is measured against the standard emissions requirement, a report of the result is displayed on the external I/O display panel 350, as shown in FIG. 5C. The report indicates whether the vessel is emitting gaseous particles that are above the emissions standard, below or near compliance, or near incompliance. The indication can be of different colors or icons. For example, red is used to illustrate that the vessel is not in compliance with the emissions standard. Orange is used to warn that the vessel may soon not be in compliance with the emissions standard. Green is used to indicate that the vessel is in compliance with the emissions standard. Other values, as appreciated by a person of ordinary skill in the art, may be used to indicate whether or not the vessel is incompliance. For example, the indicator may indicate labels such as "Ok", "Warning", and "Out of Limit" In another embodiment, the external I/O display panel 350 displays all of the information stored in a datastore to provide a user or an inspector with real-time actual statistics accrued from the analyzer 215.

The report is also transmitted to the remote bridge/control room computer system 370. The transmission of the report may be through data I/O line. Referring to FIG. 6, the remote bridge/control room computer 370 includes an emissions monitoring system positional display 375, an emissions monitoring system positional display system 380, and an emissions control system graphical user interface 385. The emissions monitoring system positional display 375 connects to an embedded server (not shown) to synchronize with data stored and sorted in the datastore of the embedded machine 310. This data may be considered as live data. Because the live data is stored and sorted in the datastore of the embedded machine 310, the emissions monitoring system display system 380 is able to obtain the live data. In an alternative embodiment, the emissions monitoring system display system 380 downloads the obtained live data in a datastore of its own.

The datastore in the emissions monitoring system display system 380 allows current real-time display of data, as well as provide for dynamic query of historical data to display. In particular, the datastore replicates the datastore of the embedded machine 310. The replication may be processed in pseudo real-time. In other words, the data retrieved or received from the analyzer 215 is stored and processed in the datastore of the embedded machine 310 and, soon after, sent to the datastore of the emissions monitoring system display system 380. As a result, the live data obtained from the datastore of the emissions monitoring system display system 380 is considered to be pseudo real-time data.

The emissions monitoring system graphical interface 385 shown in FIG. 6 displays geo-spatial information with overlay of emissions containment area/emissions control area zones. In other words, the display is on a multi-dimensional canvas depicting dynamically generated defined zones. The ECA/ECA zones may be defined in relation to land and/or ocean.

In addition, the emissions monitoring system graphical interface 385 shown in FIG. 6 displays one or more locations of vessel in the zone based on the position data in relation to the land and/or zones. The emissions monitoring system graphical interface 385 also displays one or more vessels' location based on the position data of the vessel(s) on a multi-dimensional geospatial canvas depicting dynamically generated defined zones. The emissions monitoring system graphical interface 385 also displays the requirements of the gas or gases emitted from the exhaust flow. The requirement indicates the level at which the gas or gases as well as the level at which the particulate matter should be emitted from the exhaust flow.

The emissions monitoring system graphical interface 385 also displays the actual reading of the level at which the gas or gases that are being emitted. The actual reading is retrieved either directly or indirectly from the analyzer 215. The emissions monitoring system graphical interface 385 also displays colors such as red, yellow, or green (and maybe all three) based on the reading of the gas or gases when compared to the requirements and the zone in which the vessel is located in or the zone the vessel is close to. It should be noted that the embedded machine 310 and the remote bridge/control room computer system 370 include an input/output unit 340 to alarm, via a visual indicator or an audio indicator, the user or the inspector that the actual readings of the gas or gases are above the emissions standard.

The emissions monitoring system display system 380 shown in FIG. 6 also generates a report of the above-mentioned information displayed on the emissions monitoring system graphical interface 385 for the operator or the inspector to view. The emissions monitoring system display system 380 is configured to allow the operator or inspector to query the system to playback the historical data. For example, the query can be performed by graphically illustrating on the emissions monitoring system graphical interface 385 points in time of the vessel's location based on previous position data stored in the datastore of the embedded machine 310. Or, in the alternative, the emissions monitoring system graphical interface 385 may illustrate the start point of the vessel and the end point of the vessel based on the position data stored in the datastore of the embedded machine 310. This report can be uploaded to a central server (not shown) for the inspector to view or can be printed to a printer located in the vessel or to a remote location. The emissions monitoring system graphical interface 385 can be configured to simulate geospatial data of the vessels current position to define zones and display them in real time. This allows the operator of the vessel to realize the current location of the vessel and any zone where emissions monitoring is occurring.

In addition, emissions monitoring system display system 380 and the emissions monitoring system graphical interface 385 is not limited to a computer and a LCD or CRT monitor, but can be a single component such as a blackberry device, an iPhone, iTouch, or any other device that may be appreciated by a person skilled in the art. In fact, the emissions monitoring system display system 380 is any system that has the capability to connect either wirelessly or physically to a server (not shown) and that is appreciated by a person of ordinary skill in the art.

Figure 7:
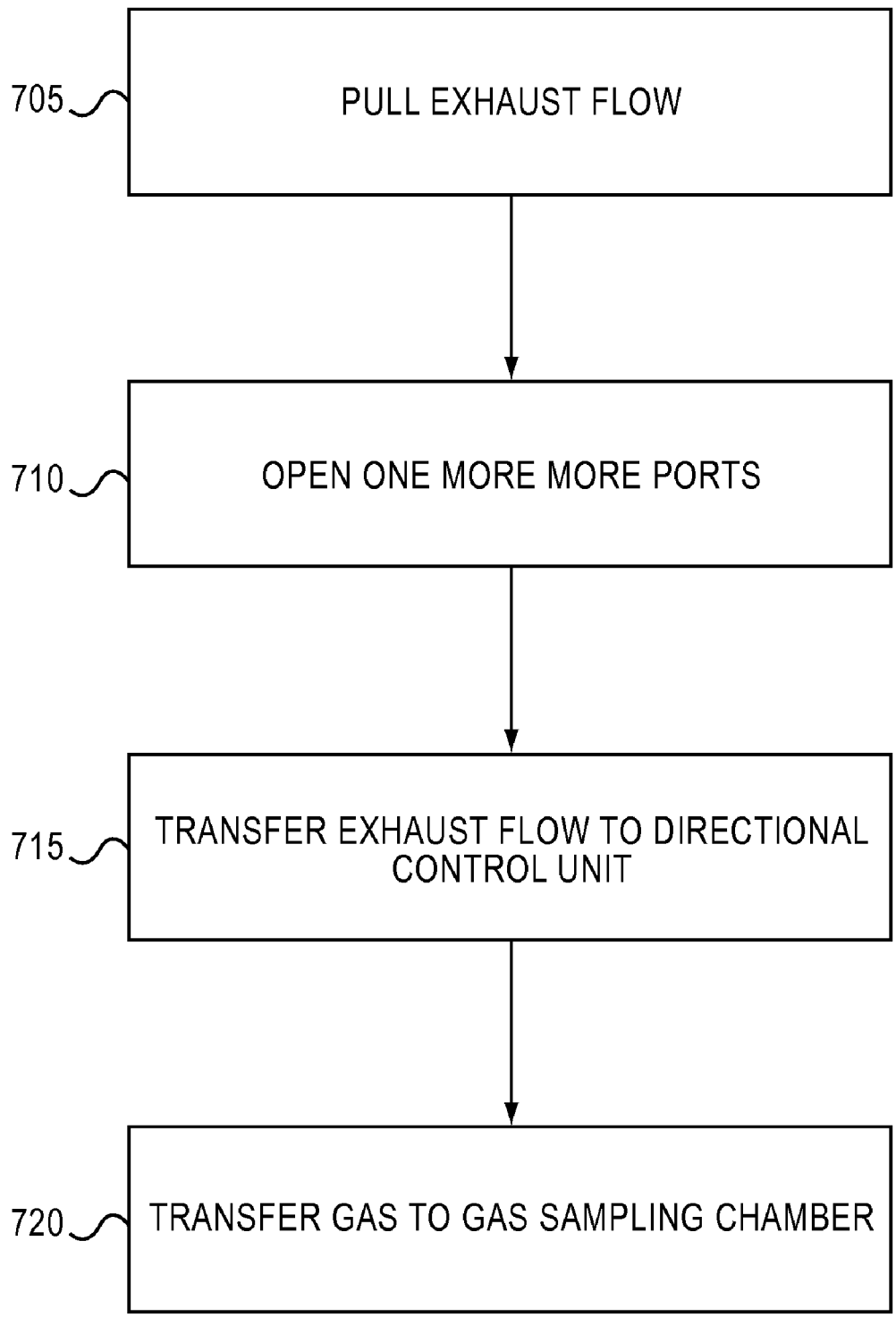
FIG. 7 is an illustration of a process to obtain a portion of the exhaust flow, in accordance with some embodiments of the invention.

FIG. 7 is an illustration of a process to obtain a portion of the exhaust flow, in accordance with an embodiment of the invention. At 705, a portion of exhaust flow is pulled from the exhaust outlet 110 by the in-stack probe 115. One or more ports 125 of the directional control unit 120 is opened by a logic determined by the embedded machine 310 at 710. Upon opening of the port(s) 125, the portion of the exhaust flow is transferred at 715 to the directional control unit 120. At 720, the portion of the exhaust flow is transferred from the directional control unit 120 to the sampling chamber 200. This allows for the gas or gases and/or the particulate matter included in the exhaust flow to be analyzed in the sampling chamber 200.

Figure 8:
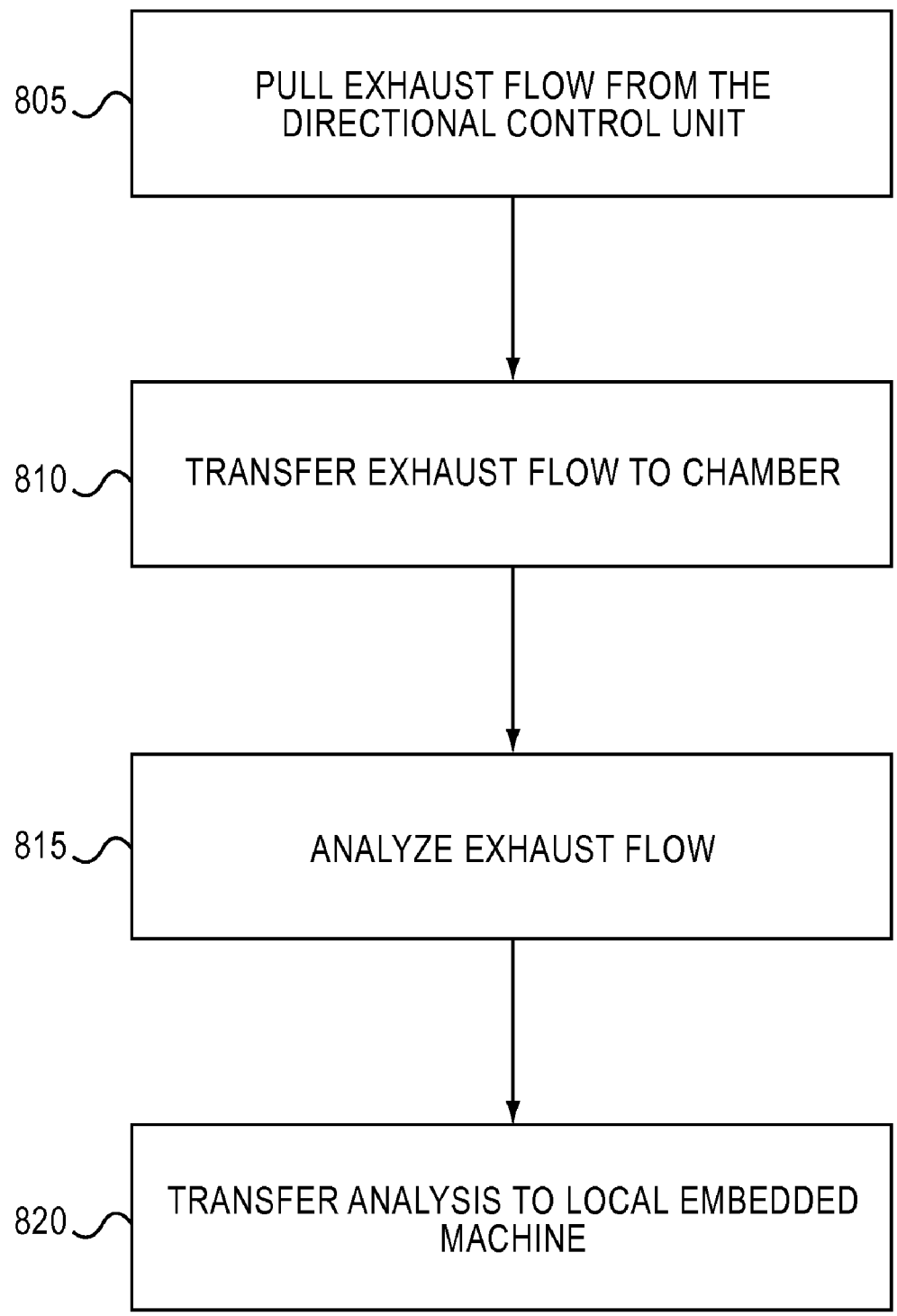
FIG. 8 is an illustration of a process to receive and analyze a portion of the exhaust flow, in accordance with an embodiment of the invention.

FIG. 8 is an illustration of a process to receive and analyze a portion of the exhaust flow. At 805, as the constant pump 230 draws the portion of the exhaust flow from the directional control unit 120 or even the exhaust outlet 110, the front end cap 205 of the sampling chamber 200 receives the portion of the exhaust flow from the directional control unit 120. The portion of the exhaust flow is then transferred, at 810, through one or more individual chambers 210. As the portion of the exhaust flow moves through one or more individual chambers 210, one or more analyzers 215 analyzes the gas or gases using a laser or lasers and the particulate matter using optics at 815. The data related to the type of gas or gases and particulate matter being analyzed by the analyzer 215 is transferred at 820 to the embedded machine 310.

Figure 9:
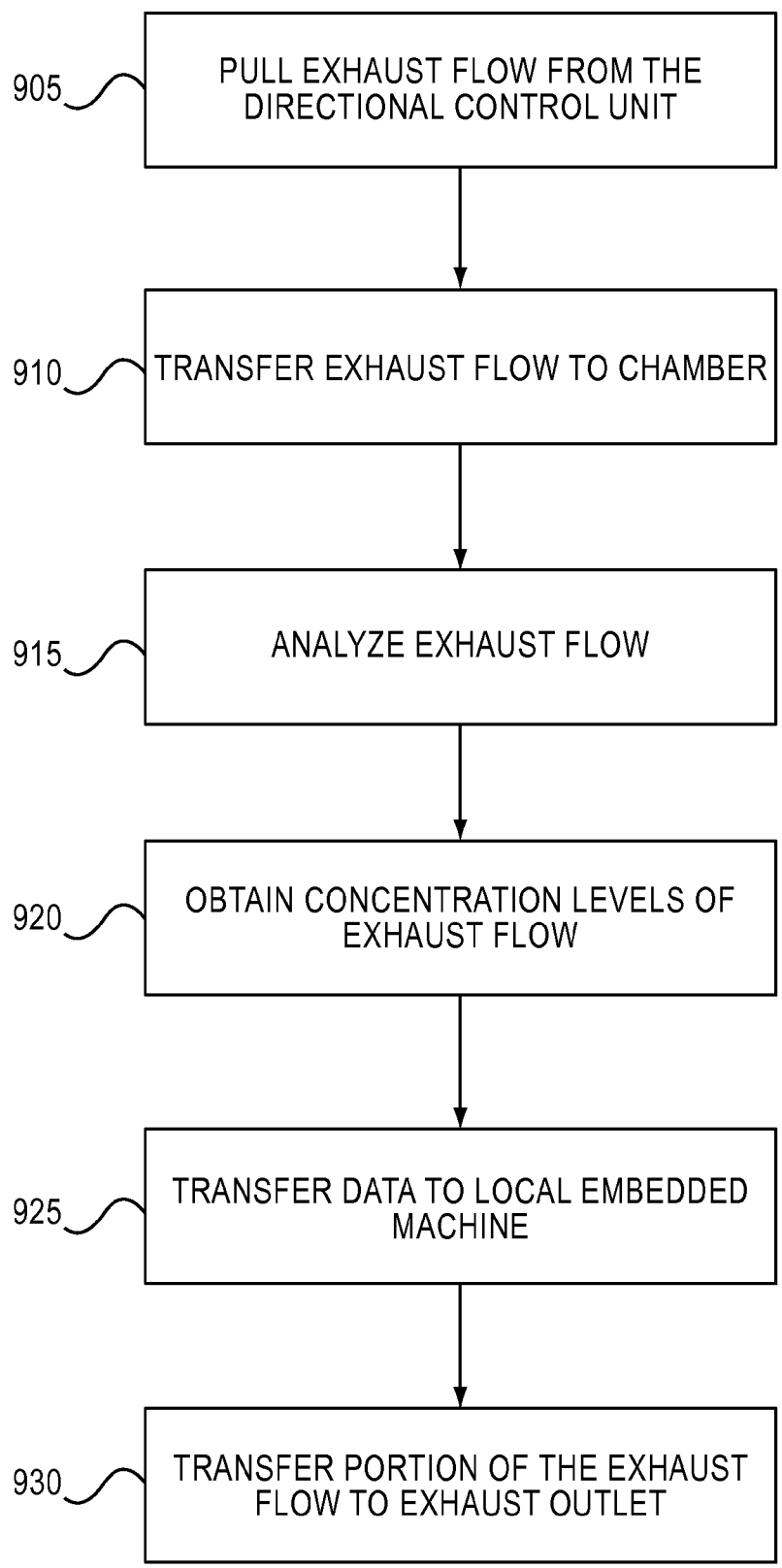
FIG. 9 is an illustration of a process to receive and analyze a portion of the exhaust flow, in accordance with another embodiment of the invention.

FIG. 9 is an illustration of a process to receive and analyze a portion of the exhaust flow, in accordance with another embodiment of the invention. At 905, as the constant pump 230 draws the portion of the exhaust flow from the directional control unit 120 or even the exhaust outlet 110, the front end cap 205 of the sampling chamber 200 receives the portion of the exhaust flow from the directional control unit 120. The portion of the exhaust flow is then transferred, at 910, through one or more individual chambers 210. As the portion of the exhaust flow moves through one or more individual chambers 210, at 915, one or more analyzers 215 analyze a concentration level of the gas or gases and the particulate matter that make up the portion of the exhaust flow. At 920, data is obtained in the analyzer 215 to illustrate the concentration level of the gas and/or the particulate matter in the exhaust flow. The obtained data may be in a numerical value. A rounding algorithm is applied to the numerical value to illustrate the concentration level for each type of gas and particulate matter in the portion of the exhaust flow. Alternatively, the data obtained can be an average reading of each type of gas and/or particulate matter in the portion of the exhaust flow. The obtained data is considered as processed data in accordance with this embodiment of the invention. The obtained data relating to each type of gas and/or particulate matter being analyzed by the analyzer 215 is transferred, at 925, to the embedded machine 310. At 930, the constant pump 230 returns the portion of the exhaust flow to the exhaust outlet 110.

Figure 10:
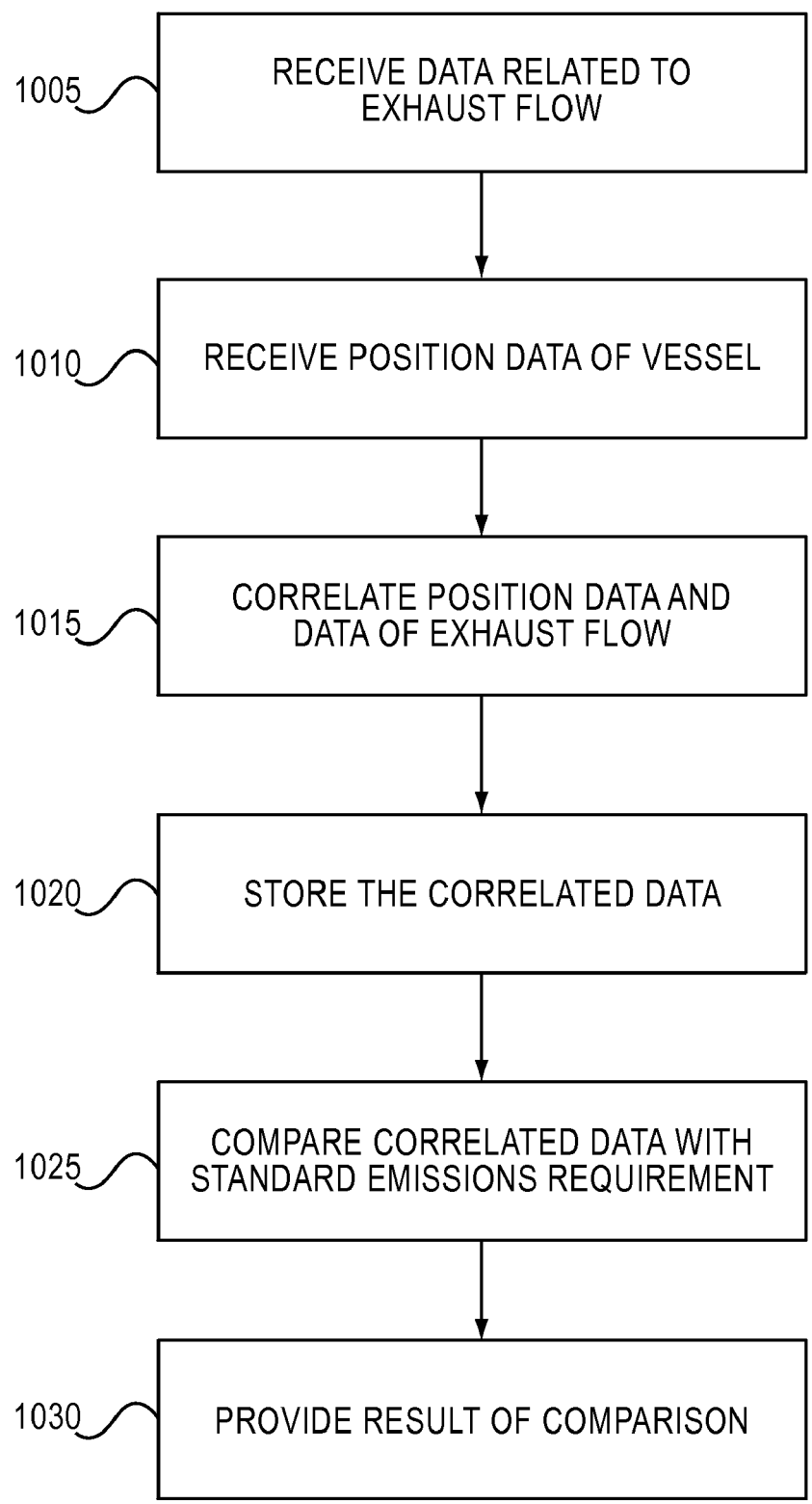
FIG. 10 is an illustration of a process to obtain data from the analyzed portion of the exhaust flow, in accordance with some embodiments of the invention.

FIG. 10 is an illustration of a process to obtain data from the analyzed portion of the exhaust flow, in accordance with an embodiment of the invention. At 1005, the embedded machine 310 receives data for each type of gas and/or particulate matter that was analyzed in the individual chamber 210. At 1010, the embedded machine 310 receives position data of the vessel from a position indicator 360. However, it should be noted that the process can be implemented to allow the embedded machine 310 to receive the data from the analyzer 215 and the position data from the position indicator 360 simultaneously. At 1015, the position data of the vessel and the data related to each of the gas and/or particulate matter in the portion of the exhaust flow is correlated together. The correlated position data and the data related to each gas and/or particulate matter of the exhaust flow is stored in the datastore according to time and location at 1020. In another embodiment, the correlated position data and the data related to each gas and/or particulate matter is stored according to any category or condition that would be appreciated by a person of ordinary skill in the art. For purposes of this embodiment, the correlated position data and the data related to each gas and/or particulate matter is considered as correlated data. At 1025, the correlated data is compared with the standard emissions requirement to determine whether the emissions of the vessel is in compliance with the standard emissions requirement. In an alternative embodiment, the raw data or the processed data is compared with the standard emissions requirement without correlating (e.g. commingling) the raw data or processed data with position data of the vessel.

At 1030, the result of the comparison is provided to the external panel 350 connected (either wirelessly or physically) to the embedded machine 310. The result of the comparison is considered as read-only data so the viewer (e.g. inspector or operator or any other person) may not manipulate the result of the comparison. Also, at 1030, the result of the comparison is provided to the remote bridge/control room computer system 370 to enable a user or inspector or any other person to view the result and determine whether the vessel is in compliance with the standard emissions requirement.

Figure 11:
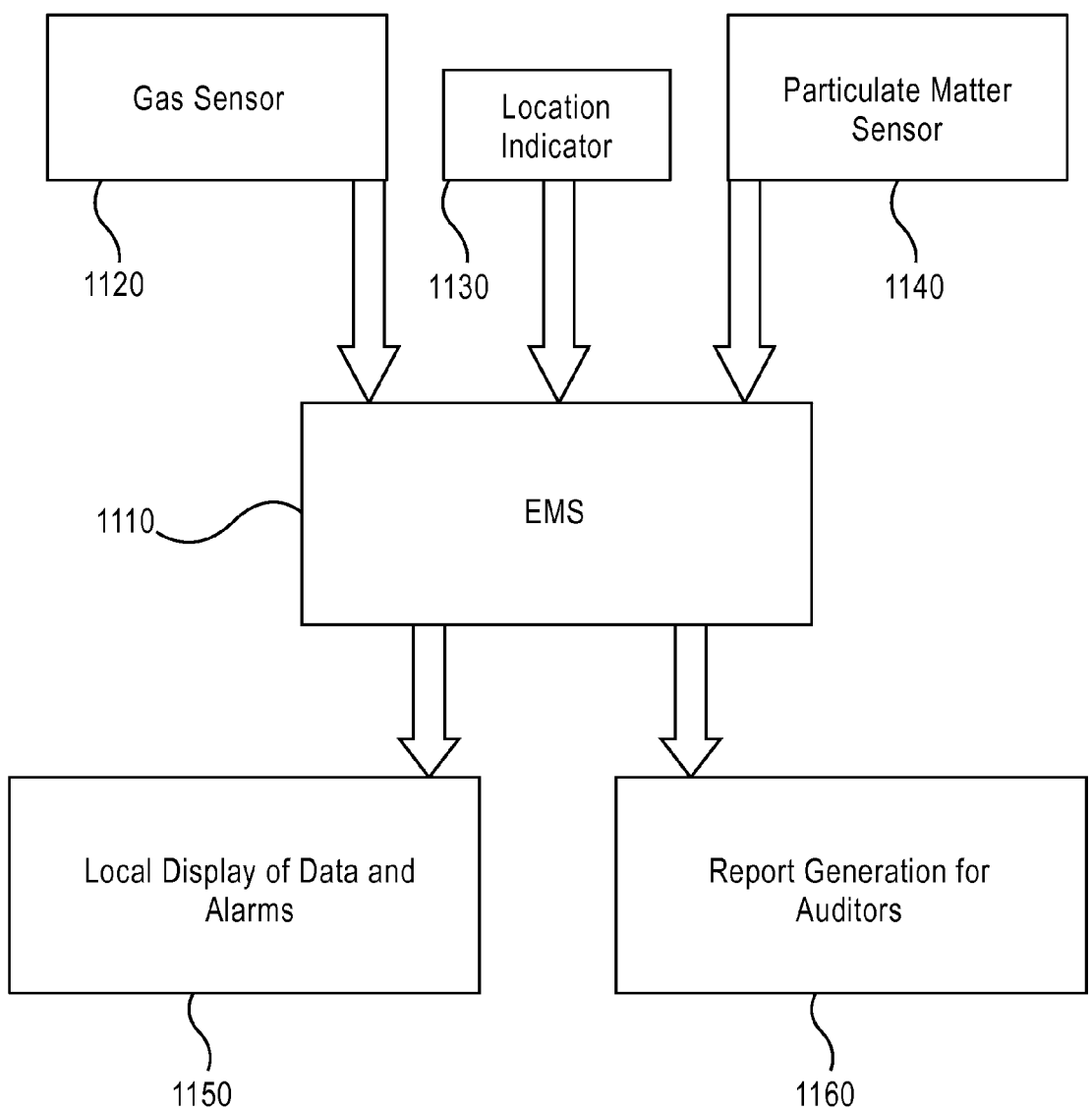
FIG. 11 is an illustration of an emissions monitoring system, in accordance with an alternative embodiment of the invention.

FIG. 11 illustrates an emissions monitoring system 1100, in accordance with another embodiment of the invention. The emissions monitoring system 1100 includes an emission monitoring unit 1110. The emission monitoring unit 1110 includes one or more inputs to receive information from one or more device and includes one or more outputs (e.g. interfaces) to transmit information to one or more device. The emissions monitoring unit 1110 connects to a gas sensor 1120, a position indicator 1130, and a particulate matter sensor 1140. The emissions monitoring unit 1110 also connects to a display 1150 of data and alarms and a report generator 1160.

However, a person of ordinary skill in the art would appreciate there to be one or more gas sensors 1120 depending on the number of gases that make up the exhaust flow. The gas sensor 1120 provides the emissions monitoring unit 1110 with data representing that concentration levels of each type of gas being emitted from the vessel. In particular, the gas sensor 1120 is equipped with one or more lasers to measure the gas or gases. The position indicator 1130 provides the emissions monitoring unit 1110 with the present location of the vessel. The particulate matter sensor 1140 provides the emissions monitoring unit 1110 with data representing the particulate matter being emitted from the vessel. In particular, the particulate matter sensor 1140 may be equipped with optics to measure the particulate matter.

The emissions monitoring unit 1110 correlates data related to each gas and/or particulate matter with the position location of the vessel. This results in an accurate reading as to how much emissions each gas is emitting at any given location and also an accurate reading of the particulate matter being emitted. The emissions monitoring unit 1110 compares the data related to each gas and/or particulate matter with the emissions standard of the geographical area the vessel is located in.

The display 1150 receives information related to the actual emissions of the vessel and the location of the vessel. The display 1150 may be located in the vicinity of or remotely from the emission monitoring unit 1110, or at any location that would be appreciated by a person of ordinary skill in the art. The report generator 1160 generates a report of the actual emissions of the vessel and the location of the vessel with respect to the standard emissions requirement for the vessel based on information received from the emissions monitoring unit 1110.

Figure 12:
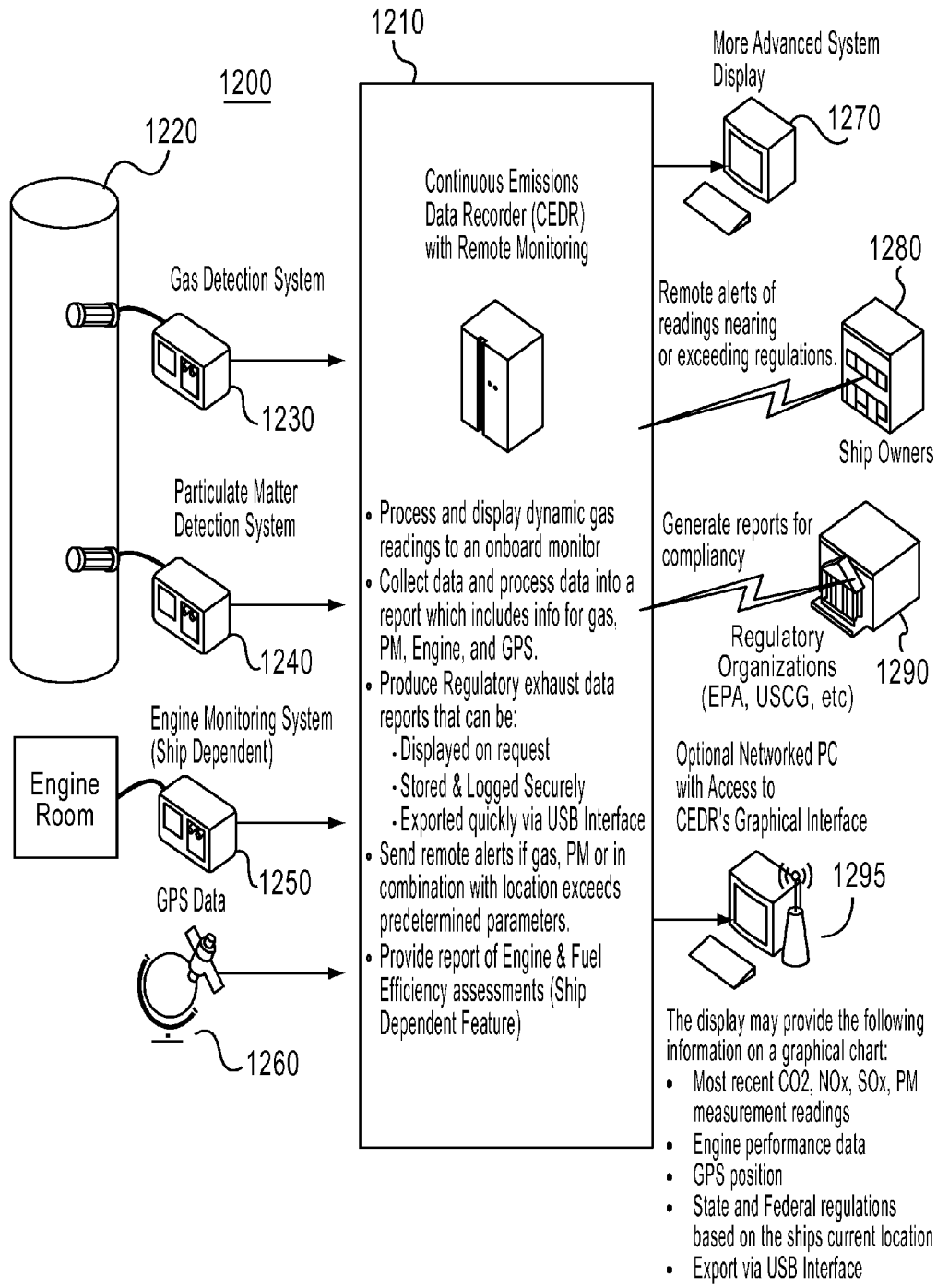
FIG. 12 is an illustration of an emissions monitoring system, in accordance with another alternative embodiment of the invention.

In accordance with another embodiment of the invention, FIG. 12 illustrates an emissions monitoring system 1200 that includes a continuous emissions data recorder with remote monitoring 1210. The emissions monitoring system 1200 includes a gas detection system 1230 and a particulate matter detection system 1240 connected to an exhaust outlet 1220. The exhaust outlet 1220 can also be considered as an exhaust chamber or sampling chamber. The emissions monitoring system 1200 also includes an engine monitoring system 1250, which may be dependent on the type of vessel, and a position indicator 1260. The emissions monitoring system 1200 also includes a display 1270, an alarm 1280, and an optional network computer 1295 with a graphical interface at a separate location in the vessel or at any separate location that would be appreciated by a person of ordinary skill in the art.

Each of the gas detection system 1230, the particulate matter detection system 1240, the engine monitoring system 1250, and the position indicator 1260 are connected to the continuous emissions data recorder 1210. The connection of each the gas detection system 1230, the particulate matter detection system 1240, the engine monitoring system 1250, and the position indicator 1260 to the continuous emissions data recorder 1210 is either a wireless connection or a physical connection. The display 1270 is connected to the continuous emissions data recorder 1210 through a physical connection or a wireless connection.

The gas detection system 1230 is configured to detect one or more types of gases in the outlet/chamber 1220. For each type of gas detected, the gas detection system 1230 is configured to analyze using laser technology the concentration level of the gas in the outlet/chamber 1220. The concentration level of the gas is communicated to the continuous emissions data recorder 1210. The concentration level of the gas may be represented as a numeric value in the form of parts per million. However, it should be noted that the numeric value is not limited to parts per million but may be any metric value that is appreciated by a person of ordinary skill in the art.

The particulate matter detection system 1240 is configured to detect the particulate matter in the chamber 1220. The particulate matter detection system 1240 also analyzes using optics the concentration level of the particulate matter, which may also have a numeric value. The concentration level of the particulate matter is communicated to the continuous emissions data recorder 1210. The location indicator 1260 provides positional data of the vessel to the continuous emissions data recorder 1210 at the time the detection of the particulate matter and the gases is performed. The engine monitoring system 1250 provides the continuous emissions data recorder 1210 with a report of the engine and fuel efficiency assessment based on the current reading of the vessel. For example, the engine monitoring system 1250 may provide an engine state. An engine state may include any performance or metric data of an engine including, but not limited to, RPM, fuel quality, heat state, mechanical efficiency, in-cylinder heat, emissions, or any other data that would be appreciated by a person of ordinary skill in the art. A person of ordinary skill in the art would also appreciate that engine state may be measured by sensors operatively connected to the engine either in the vehicle or at a remote location.

The continuous emissions data recorder 1210 records the concentration levels of the gases and/or the concentration level of the particulate matter in a datastore of the continuous emissions data recorder 1210. The continuous emissions data recorder 1210 processes the concentration levels of the gases and/or the concentration level of the particulate matter with the position data received from the location indicator 1260 into a report. The report includes information related to each type of gas detected, the particulate matter detected, the engine, and the positional data. The report also includes the concentration level of the gas or gases and/or the particulate matter that may be included in the exhaust flow.

In addition, continuous emissions data recorder 1210 compares the concentration levels of the gases and/or the concentration level of the particulate matter with the regulatory requirements of the gases and the particulate matter. In response to the comparison, the continuous emissions data recorder 1210 produces a report indicating whether the concentration levels of the gases and/or the concentration level of the particulate matter are in compliance with the regulatory requirements. In other words, the report indicates whether the emissions from the vessel are in compliance with the regulatory requirements of the zone the vessel is located in.

The report is sent to a display 1270 located in the vicinity of the continuous emissions data recorder to display a read-only version of the results for an operator or inspector to view. The report is also transmitted, via a network (not shown), to a regulatory organization/agency 1290 to indicate whether the emissions from the vessel is incompliance with the regulatory requirements. A person of ordinary skill in the art would readily appreciate that the report can also be exported via a USB interface or stored and logged securely in the continuous emissions data recorder 1210.

When the report indicates that the emissions from the vessel nearing or exceeding the regulatory requirements, the continuous emissions data recorder 1210 alerts, via the alarm 1280, the operators of the vessel or the inspectors. The alert is also sent when any one of the gas, particulate matter, or any combination thereof exceeds or is close to exceeding the regulatory requirements (e.g. predetermined parameters) of the zone that vessel is located in.

The continuous emissions data recorder 1210 also provides the networked computer 1295 access to continuous emissions data recorder with information to be display on a graphical user interface of the networked computer 1295. Referring to FIG. 13, the information is displayed on a graphical chart with the most recent measurement readings of gas, such as $CO_2$, $NO_x$, $SO_x$, and PM. The information also includes engine performance data, the position data of the vessel, state and federal regulations based on the vessel's current location. Other information that may displayed on the graphical chart includes exhaust data monitor (e.g. reading of each gas and particulate matter), engine data monitor, fuel data monitor, data log, current information, navigation information, suggested fuel use, suggested engine use, data chart, and a geographical map, or any other information that would be appreciated by a person of ordinary skill in the art. Referring back to FIG. 12, the networked computer 1295 is configured with a USB interface and/or a wireless network to export the information displayed on the graphical user interface of the networked computer 1295. In addition, the networked computer 1295 also includes a datastore to store the information received from the continuous emissions data recorder 1210.

Figure 14:
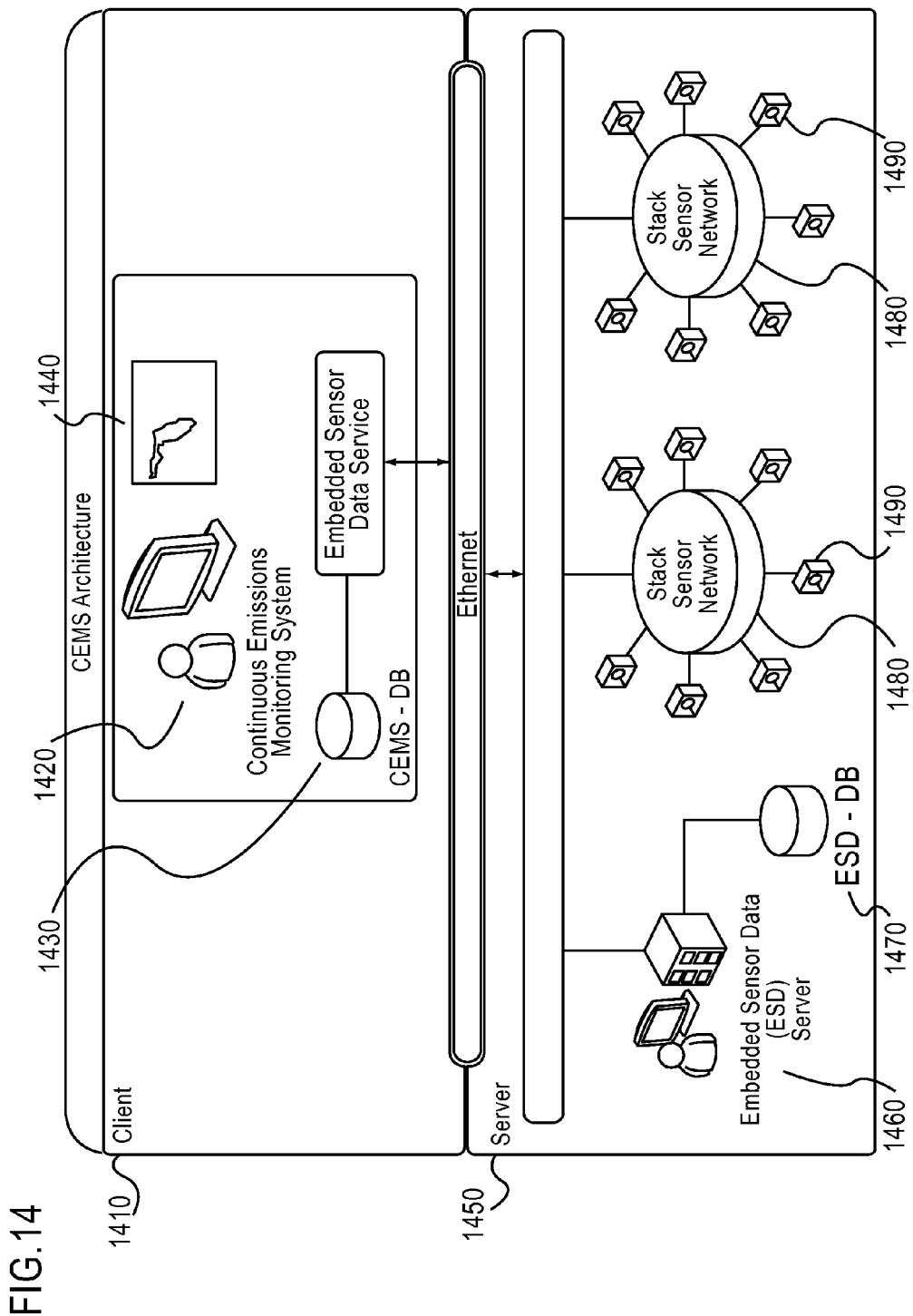
FIG. 14 is an illustration of another graphical user interface, in accordance with some embodiments of the invention.

FIG. 14 is an illustration of a continuous emissions monitoring system (CEMS) architecture, in accordance with an alternative embodiment of the invention. The CEMS architecture includes a client 1410 and a server side 1450. The client 1410 includes a continuous emissions monitoring system 1420. The continuous emissions monitoring system 1420 includes a datastore 1430 and a graphical user interface 1440. The client 1410 may be located in the vessel. The server 1450 includes an embedded sensor data server 1460 connected to an embedded sensor data datastore 1470. The embedded sensor data server 1460 may be located at a remote location separate from the vessel. The server 1450 also includes one or more stack sensor networks 1480, such as the analyzer 215 illustrated in FIG. 2. In FIG. 14, for exemplary purposes, two stack sensor networks 1480 are illustrated. These stack sensor networks 1480 illustrate two different vessels. The stack sensor network 1480 are connected to one or more sensors 1490. As a result, each individual vessel has the ability to network all of their respective vessel's sensor data onto one network and feed that information into a server (e.g. embedded sensor data sensor 1460) at a land site or separate data base control facility (e.g. embedded sensor data datastore 1470).

As illustrated in FIG. 14, the one or more sensors 1490, which may be disposed on a vessel's sampling chamber (not shown) or on the vessel's exhaust outlet (not shown), detects a concentration levels of each gas and a concentration level of the particulate matter emitted from an exhaust flow of the vessel. The data related to the concentration levels of each gas and particulate matter is transmitted to a embedded sensor data datastore 1470 via the stack sensor network 1480. The analyzing, correlating, comparing and any other process appreciated by a person of ordinary skilled in the art may be carried out in a manner similar to those discussed above with respect to some embodiments of the invention. Furthermore, because the stack sensor network may be located on the vessel, the transfer of all data related to the concentration levels of each of the gases and particulate matter to the embedded sensor data datastore 1470 is transmitted more efficiently.

The operator or inspector, who may be on board of the vessel, may access the data stored in the embedded sensor data datastore 1470 by downloading the data directly to the datastore 1430 of the continuous emissions monitoring system 1420. The process of downloading the data may be similar to those discussed above with respect to some embodiments of the invention. This data is displayed on the graphical user interface 1440. The graphical user interface 1440 is similar to some of the graphical user interfaces discussed above with respect to some embodiments of the invention.

FIG. 15 illustrates a similar graphical user interface, as discussed above with respect to FIG. 13, in accordance with an embodiment of the invention. In addition to the information discussed with FIG. 13, the graphical user interface illustrated in FIG. 15 illustrates one or more vessels in relation to the regulated emissions zone around the coast of Florida. However, it should be noted that one or more vessels may be illustrated in the graphical user interface of FIG. 15 in relation to the regulated emissions zone in or around any other state, region, territory, and/or country. As a result, one or more vessels around the coast of Florida may know the emissions standard for vessels that are in the zone around the cost of Florida. The vessels may also understand what information needs to be transmitted to the inspector when the vessels are in the zone around the coast of Florida.

Figure 16:
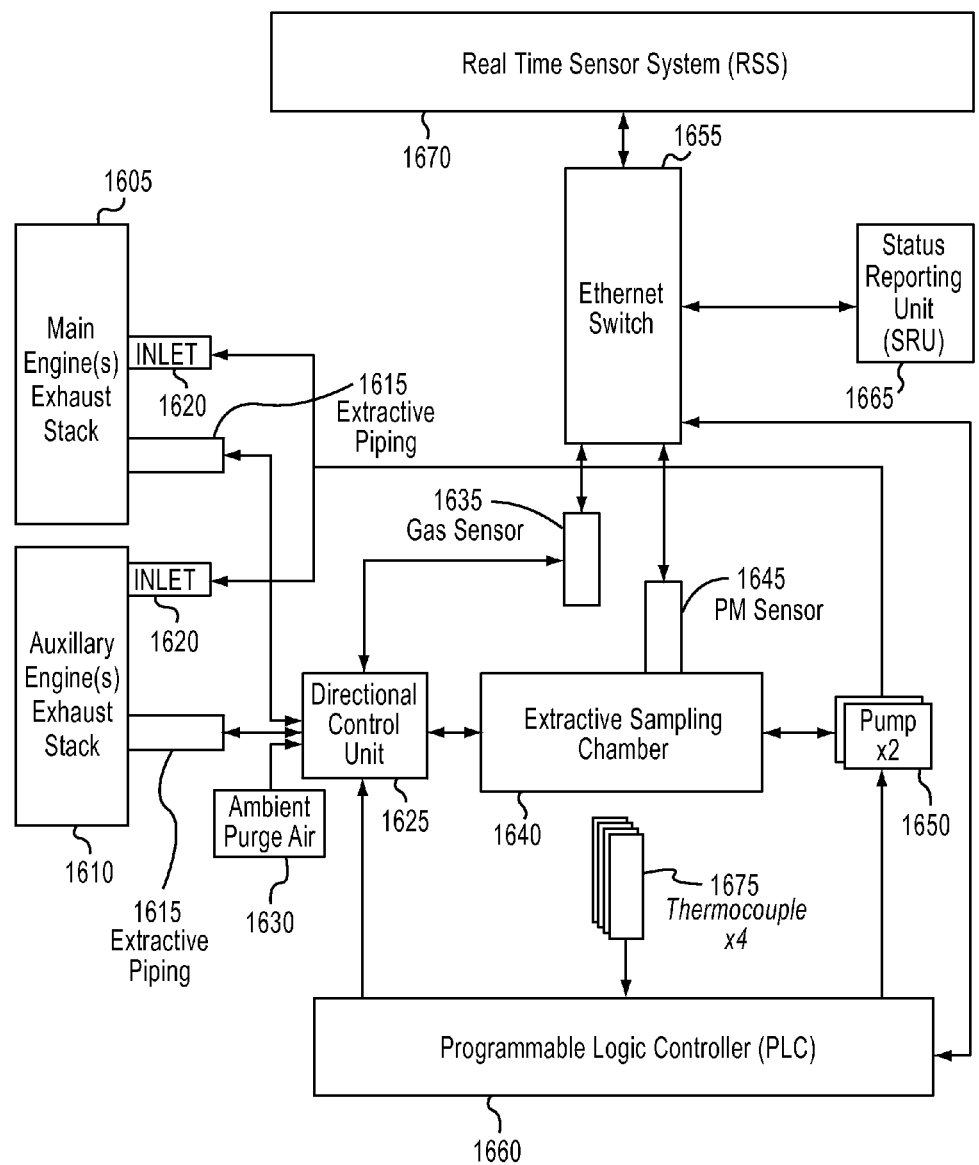
FIG. 16 is an illustration of an emissions monitoring system, in accordance with another embodiment of the invention.

FIG. 16 is an illustration of an emissions monitoring system, in accordance with another embodiment of the invention. The emissions monitoring system shown in FIG. 16 includes a main engine exhaust stack 1605 and an auxiliary engine exhaust stack 1610. However, a person of ordinary skill in the art would readily appreciate that the system may include additional exhaust stacks. Connected to the main engine exhaust stack 1605 and the auxiliary engine exhaust stack 1610 is an extractive piping 1615. The extractive piping 1615 operatively connects to a directional control unit 1625, via gas flow piping.

Further, ambient purge air 1630 is also operatively connected the directional control unit 1625, via gas flow piping. The directional control unit 1625 is operatively connected to a gas sensor 1635 and an extractive sampling chamber 1640, via gas flow piping. The extractive sampling chamber 1640 operatively connects to a particulate matter (PM) sensor 1645, and also operatively connects to at least one pump 1650.

The system shown in FIG. 16 can also include an Ethernet switch 1655, which is operatively connected, via an Ethernet line, to the gas sensor 1635, the PM sensor 1645, a controller 1660, a status reporting unit (SRU) 1665, and a real time sensor system (RSS) 1670. The controller 1660 operatively connects, via a control line, to the directional control unit 1625 and the pump 1650. The controller 1660 also operatively connects, via a thermo line, to a thermocouple 1675.

The functionality of FIG. 16 is now be discussed below. As exhaust flow is flowing out of the main engine exhaust stack 1605, a portion of the exhaust flow is extracted from the main engine exhaust stack 1605. In particular, the portion of the exhaust flow is extracted from the main engine exhaust stack 1605 and directed to the directional control unit 1630, via the extractive piping 1615. The directional control unit 1620 then generally redistributes the portion of the exhaust flow to the gas sensor 1635 and the extractive sampling chamber 1640.

To analyze, for example, nitric oxide, nitrogen dioxide, sulfur oxide, and carbon dioxide levels in the portion of the exhaust flow, the gas sensor 1635 receives the portion of the exhaust flow in a chamber within the gas sensor 1635. In this embodiment, the gas sensor may be a cascade laser sensor having its own chamber with four lasers to measure the gas levels. However, a person of ordinary skill in the art would appreciate that the sensor can be any type of laser sensor and there may be a number of lasers depending on the number of gases. Inside the chamber of the gas sensor 1635, the four lasers are configured to measure the levels of nitric oxide, nitrogen dioxide, sulfur oxide, and carbon dioxide. These measurements are then reported to the RSS 1670 via the Ethernet switch 1655.

Furthermore, the PM sensor 1645 provides an optical sensor to view the gas as it is flowing within the extractive sampling chamber 1640. For example, as the pump 1650 draws the portion of the exhaust flow into the extractive sampling chamber 1640, the PM sensor 1645 measures a concentration level of the particulate matter using an optical sensor. It should be appreciated, however, that the PM sensor 1645 may be an extractive PM analyzer or any other type of PM analyzer that measures the concentration level of the particulate matter. Once the measurement is performed, the PM sensor 1645 then transmits, via Ethernet switch 1655, particulate matter data to the RSS 1670.

Once measurements of the portion of the exhaust flow is completed, the pump 1650 returns the portion of the exhaust flow back to the main engine exhaust stack 1605, via an inlet 1620. For example, the portion of the exhaust flow can be returned through the direction control unit 1625 or directly to the exhaust stack from which the portion of the exhaust flow was extracted. To remove the portion of the exhaust flow from the directional control unit 1625, the gas sensor 1635, and/or the extractive sampling chamber 1640, clean or ambient air, for example, is transferred from the ambient purge air 1630 to at least one of the directional control unit 1625, the gas sensor 1635, and the extractive sampling chamber 1640.

The RSS 1670, which receives data from the sensors, can be a type of processing mechanism that analyzes the received data. The RSS 1670 also stores the data from the gas sensor 1635 and the PM sensor 1645 in a datastore (not shown). The RSS 1670 also provides the information necessary for the SRU 1665 to report a status of, for example, the concentration levels of the gases and particulate matter, as well as other relevant data.

In this embodiment, the thermocouple 1675 shown in FIG. 16 is a mechanism to capture and assess temperature at various locations of the system. For example, the thermocouple 1675 can be located (not shown) in the exhaust stacks 1605, 1610, the directional control unit 1625, the extractive sampling chamber 1640, gas sensor 1635, Ethernet switch 1650, a location external to the system, and a location near the controller 1660. The thermocouple 1675 located external to the system is configured to monitor the temperature of the ambient air.

As discussed above, FIG. 16 shows a controller 1660 operatively connected to the RSS 1670, via the Ethernet switch 1650. In this embodiment, the controller 1660 can be a programmable logic controller. The controller 1660 can be programmed by the RSS 1670 or any other device or unit that would be appreciated by a person of ordinary skill in the art. The controller 1660 can also be configured to control one or n number of sensors, thermocouples, the ambient air purge, the pump, as well as any other unit that would be appreciated by a person of ordinary skill in the art.

The SRU 1665 shown in FIG. 16 can be operatively connected, via an Ethernet switch 1650, with the RSS 1670 or any other element to poll the analysis data from the datastore. The SRU 1665 can also provide a graphical user interface with the capability to extract data in the form of, for example, an excel spreadsheet. For example, the SRU 1665 can have a mechanism to extract time slices or reports from the data. In other words, the SRU 1665, which can be a computer with an application stored on it, can run reports against the collected data. A person of ordinary skill in the art would appreciate that there may be a number of SRU 1665 located in a system or can be located in a remote location away from the system.

The above-mentioned embodiments of the invention provide a cost-effective solution to comply with the current standard emissions requirement as well as future emissions requirement. In addition, the emissions control system provides an automated emissions monitoring and assessment of compliance to environment zone requirements, and provides the ability to automatically produce emission reports for port auditors/authorities upon request. The emissions control system may also provide a low life cycle maintenance cost, and saves fuel through engine optimization of the vessel. The embodiments of the emissions control system can be implemented in other sensor based systems that would be appreciated by a person of ordinary skill in the art. The emissions control system described in some of the embodiments of the invention may also apply different alarm threshold (e.g. emissions requirements) based on a geographic location of the vessel. The emissions control system described in some of the embodiments of the invention may provide an automated update and/or upgrade of requirements via a downloaded data from a server.

It should be noted that many of the functional units/components/devices described in this specification have been presented as units in order to more particularly emphasize their implementation independence. For example, a unit may be implemented as a hardware circuit comprising custom VLSI circuits or gate arrays, off-the-shelf semiconductors such as logic chips, transistors, or other discrete components. A unit may also be implemented in programmable hardware devices such as field programmable gate arrays, programmable array logic, programmable logic devices or the like.

Units may also be partially implemented in software for execution by various types of processors. An identified unit of executable code may, for instance, comprise one or more physical or logical blocks of computer instructions which may, for instance, be organized as an object, procedure, or function. Nevertheless, the executables of an identified unit need not be physically located together, but may comprise disparate instructions stored in different locations which, when joined logically together, comprise the unit and achieve the stated purpose for the unit.

Indeed, a unit of executable code could be a single instruction, or many instructions, and may even be distributed over several different code segments, among different programs, and across several memory devices. Similarly, operational data may be identified and illustrated herein within units, and may be embodied in any suitable form and organized within any suitable type of data structure. The operational data may be collected as a single data set, or may be distributed over different locations including over different storage devices, and may exist, at least partially, merely as electronic signals on a system or network.

A computer program embodied on a computer-readable medium, a compute-readable medium encoded with a computer program, or similar language may be embodied as a tangible data storage device storing computer software programs configured to control a processor, digital processing device, central processing unit (CPU), or the like, to perform one or more operations or execute one or more software instructions. A tangible data storage device may be embodied as a volatile memory device or a nonvolatile memory device, and/or a combination of a volatile memory device and a nonvolatile memory device. Accordingly, the invention provides for a computer-readable medium encoded with a computer program, where the computer program is configured to perform operations (however not limited to) discussed above.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the invention should be or are in any single embodiment of the invention. Rather, language referring to the features and advantages is understood to mean that a specific feature, advantage, or characteristic described in connection with an embodiment is included in at least one embodiment of the invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

We claim:

1. An apparatus, comprising:
a sampling chamber configured to receive a portion of an exhaust flow from an exhaust stack, wherein the portion of the exhaust flow comprises one or more gases and particulate matter;
a gas analyzer configured to receive the portion of the exhaust flow to measure at least one emission level of the one or more gases using a laser and output a signal indicative thereof; and
a particulate matter analyzer operatively connected to the sampling chamber and configured to measure the particulate matter using optics and output a signal indicative thereof.

2. The apparatus of claim 1, further comprising:
a directional control unit configured to open and close ports, and configured to receive the portion of an exhaust flow from an exhaust stack and transfer the portion of the exhaust flow to the sampling chamber and the gas analyzer.

3. The apparatus of claim 1, further comprising:
a constant pump configured to draw the portion of the exhaust flow from the direction control unit to the sampling chamber, and further configured to return the portion of the exhaust flow to the exhaust stack.

4. The apparatus of claim 2, wherein the directional control unit is operatively connected to one or more exhaust stacks, and further configured to receive the portion of the exhaust flow from at least one stack.

5. The apparatus of claim 1, wherein, when analysis of the portion of the exhaust flow is completed, the constant pump is further configured to return the portion of the exhaust flow to the exhaust stack.

6. The apparatus of claim 1, wherein the gas analyzer comprises a chamber with a number of lasers, each laser dedicated to a specific type of gas.

7. The apparatus of claim 6, wherein the chamber of the gas analyzer is further configured to receive the portion of the exhaust flow from directional control unit.

8. The apparatus of claim 7, wherein the number of lasers comprises at least one of a nitrogen oxide laser, a sulfur oxide laser, and a carbon dioxide laser, and
wherein the nitrogen oxide laser is configured to measure and collect data related to nitrogen oxide, the sulfur oxide laser is configured to measure and collect data related to sulfur oxide, and the carbon dioxide laser is configured to measure and collect data related to carbon dioxide.

9. The apparatus of claim 8, wherein the gas analyzer is further configured to transmit, via a network, the nitrogen oxide data, the sulfur oxide data, and the carbon dioxide data to a processing unit.

10. The apparatus of claim 1, wherein the particulate matter analyzer is further configured to transmit, via a network, particulate matter data to the processing unit.

11. The apparatus of claim 1, further comprising:
a plurality of thermocouples, each thermocouple is located at a specific location within the apparatus, and configured to
measure temperature at the specific location, and
transmit, via a network, the temperature at the specific location to the processing unit.

12. The apparatus of claim 1, further comprising:
an ambient air purge operatively connected to the directional control unit, and configured to transfer ambient air to a directional control unit, the gas analyzer, and the sampling chamber,
wherein the ambient air is configured to purge the portion of exhaust flow from the directional control unit, the gas analyzer, and the sampling chamber.

13. The apparatus of claim 1, wherein the gas analyzer measures one or more gases using chemiluminescence.

14. An apparatus configured to monitor emissions of an engine, the apparatus comprising:
a processor configured to receive and process data associated with a plurality of gases, particulate matter, and an engine state, and process a time the data is received, and configured to generate a report, based on the processed data, indicative of a concentration level for each emitted gas, a concentration level of the particulate matter, and the engine state; and
a transmitter configured to transmit an alert when the concentration level of one of the gases exceeds a predetermined gas level, or when the concentration level of the particulate matter exceeds a predetermined particulate matter level.

15. The apparatus of claim 14, wherein the time is a global position system time of the engine.

16. The apparatus of claim 14, wherein the data associated with the plurality of gases is received from a gas analyzer configured to measure the concentration levels of gases using at least one laser, and
wherein the data associated with the particulate matter is received from a particulate matter analyzer configured to measure the concentration levels of the particulate matter using optics.

17. The apparatus of claim 14, wherein the data associated with the plurality of gases comprises nitrous oxide data, sulfur oxide data, and carbon dioxide data, and
wherein the nitrous oxide data is indicative of a concentration level of nitrous oxide, the sulfur oxide data is indicative of a concentration level of sulfur oxide, and the carbon dioxide data is indicative of a concentration level of carbon dioxide.

18. The apparatus of claim 17, wherein processor is further configured to correlate the nitrous oxide data with a vehicle position and determine whether the concentration level of the nitrous oxide exceeds a predetermined nitrous oxide level based on the vehicle position,
correlate the sulfur oxide data with the vehicle position and determine whether the concentration level of the sulfur oxide exceeds a predetermined sulfur oxide level based on the vehicle position, and
correlate carbon dioxide data with the vehicle position and determine whether the concentration level of the carbon dioxide exceeds a predetermined carbon dioxide level based on the vehicle position.

19. The apparatus of claim 18, wherein the particulate matter data is indicative of a concentration level of the particulate matter.

20. The apparatus of claim 19, wherein the processor is further configured to correlate the particulate matter data with the vehicle position, and determine whether the concentration level of the particulate matter exceeds a predetermined particulate matter level based on the vehicle position.

21. A method, comprising:
receiving, at a sampling chamber, a portion of an exhaust flow from an exhaust stack, wherein the portion of the exhaust flow comprises one or more gases and particulate matter;
receiving, at a gas analyzer, the portion of the exhaust flow to measure at least one emission level of the one or more gases using a laser and outputting a signal indicative thereof; and
measuring, by a particulate matter analyzer, the particulate matter using optics and outputting a signal indicative thereof.

22. The apparatus of claim 21, further comprising:
receiving, at a directional control unit, the portion of an exhaust flow from an exhaust stack; and
transferring the portion of the exhaust flow to the sampling chamber and the gas analyzer.

23. The method of claim 21, further comprising:
drawing, by a constant pump, the portion of the exhaust flow from the direction control unit to the sampling chamber; and
returning the portion of the exhaust flow to the exhaust stack.

24. The method of claim 22, further comprising:
receiving, at the sampling chamber, the portion of the exhaust flow from one of a plurality of exhaust stacks, via the direction control unit.

25. The method of claim 23, further comprising:
returning the portion of the exhaust flow to the exhaust stack, when analysis of the portion of the exhaust flow is completed.

26. The method of claim 21, further comprising:
receiving the portion of the exhaust flow in a chamber of the gas analyzer,
wherein the chamber is equipped with a number of lasers, and each laser is dedicated to a specific type of gas.

27. The method of claim 26, further comprising:
receiving, from the directional control unit, the portion of the exhaust flow in a chamber of the gas analyzer.

28. The method of claim 27, wherein the portion of the exhaust flow comprises nitrogen oxide, sulfur oxide, carbon dioxide, and particulate matter.

29. The method of claim 28, further comprising:
measuring and collecting data related to the nitrogen oxide by a nitrogen oxide laser;
measuring and collecting data related the sulfur oxide by a sulfur oxide laser; and
measuring and collecting data related to the carbon dioxide by a carbon dioxide laser.

30. The method of claim 29, further comprising:
transmitting, via a network, the nitrogen oxide data, the sulfur oxide data, and the carbon dioxide data to a processing unit.

31. The method of claim 21, further comprising:
transmitting, via a network, particulate matter data to the processing unit.

32. The method of claim 21, further comprising:
measuring, by a thermocouple, temperature in plurality of locations of an method; and
transmitting, via a network, the temperature of the plurality of locations to the processing unit.

33. The method of claim 21, further comprising:
transferring, by an ambient air purge, ambient air to a directional control unit, the gas analyzer, and the sampling chamber; and
purging the portion of exhaust flow from the directional control unit, the gas analyzer, and the sampling chamber.

34. The method of claim 21, further comprising:
measuring the gas analyzer measures one or more gases using chemiluminescence.

35. A method for monitoring emissions of an engine, the method comprising:
receiving and processing data associated with a plurality of gases, particulate matter, and an engine state, and processing a time the data is received;
generating a report, based on the processed data, indicative of a concentration level for each emitted gas, a concentration level of the particulate matter, and the engine state; and
transmitting an alert when the concentration level of one of the gases exceeds a predetermined gas level, or when the concentration level of the particulate matter exceeds a predetermined particulate matter level.

36. The method of claim 35, wherein the time is a global position system time of the engine.

37. The method of claim 35, wherein the data associated with the plurality of gases is received from a gas analyzer configured to measure the concentration levels of gases using at least one laser, and
wherein the data associated with the particulate matter is received from a particulate matter analyzer configured to measure the concentration levels of the particulate matter using optics.

38. The method of claim 37, wherein the data associated with the plurality of gases comprises nitrous oxide data, sulfur oxide data, and carbon dioxide data, and
wherein the nitrous oxide data is indicative of a concentration level of nitrous oxide, the sulfur oxide data is indicative of a concentration level of sulfur oxide, and the carbon dioxide data is indicative of a concentration level of carbon dioxide.

39. The method of claim 38, further comprising:
correlating the nitrous oxide data with a vehicle position, and determining whether the concentration level of the nitrous oxide exceeds a predetermined nitrous oxide level based on the vehicle position,
correlating the sulfur oxide data with the vehicle position, and determining whether the concentration level of the sulfur oxide exceeds a predetermined sulfur oxide level based on the vehicle position, and
correlating carbon dioxide data with the vehicle position, and determining whether the concentration level of the carbon dioxide exceeds a predetermined carbon dioxide level based on the vehicle position.

40. The method of claim 39, wherein the particulate matter data is indicative of a concentration level of the particulate matter.

41. The method of claim 40, further comprising:
correlating the particulate matter data with the vehicle position, and determining whether the concentration level of the particulate matter exceeds a predetermined particulate matter level based on the vehicle position.

42. A non-transitory computer readable medium encoded with a computer program, the computer program, when executed, is configured to control a processor to perform:
receive and process data associated with a plurality of gases, particulate matter, and an engine state, and processing a time the data is received;
generate a report, based on the processed data, indicative of a concentration level for each emitted gas, a concentration level of the particulate matter, and the engine state; and
transmit an alert when the concentration level of one of the gases exceeds a predetermined gas level, or when the concentration level of the particulate matter exceeds a predetermined particulate matter level.

43. The non-transitory computer readable medium of claim 42, wherein the data associated with the plurality of gases is received from a plurality of gas analyzers configured to measure the concentration levels of gases using a laser,
wherein the data associated with the particulate matter is received from a particulate matter sensor configured to measure the concentration level of the particulate matter using a laser; and
wherein the data associated with the vehicle position is received from a position indicator.

44. The non-transitory computer readable medium of claim 42, wherein the data associated with the plurality of gases comprises nitrous oxide data, sulfur oxide data, and carbon dioxide data, and
wherein the nitrous oxide data is indicative of a concentration level of nitrous oxide, the sulfur oxide data is indicative of a concentration level of sulfur oxide, and carbon dioxide data is indicative of a concentration level of carbon dioxide.

45. The non-transitory computer readable medium of claim 44, wherein the computer program, when executed, is further configured to control a processor to perform:
correlate the nitrous oxide data with a vehicle position and determine whether the concentration level of the nitrous oxide exceeds a predetermined nitrous oxide level based on the vehicle position;
correlate the sulfur oxide data with the vehicle position and determine whether the concentration level of the sulfur oxide exceeds a predetermined sulfur oxide level based on the vehicle position; and
correlate carbon dioxide data with the vehicle position and determine whether the concentration level of the carbon dioxide exceeds a predetermined carbon dioxide level based on the vehicle position.

46. The non-transitory computer readable medium of claim 45, wherein the particulate matter data is indicative of a concentration level of the particulate matter.

47. The non-transitory computer readable medium of claim 46, wherein the computer program, when executed, is further configured to control a processor to perform:
correlate the particulate matter data with the vehicle position, and determine whether the concentration level of the particulate matter exceeds a predetermined particulate matter level based on the vehicle position.

48. A method, comprising:
receiving and processing data associated with a plurality of gases and particulate matter, and processing a time the data is received;
generating a report, based on the processed data, indicative of a concentration level for each emitted gas and a concentration level of the particulate matter; and
transmitting an alert when the concentration level of one of the gases exceeds a predetermined gas level, or when the concentration level of the particulate matter exceeds a predetermined particulate matter level.

49. A non-transitory computer readable medium encoded with a computer program, the computer program, when executed, is configured to control a processor to perform:

receive and process data associated with a plurality of gases and particulate matter, and processing a time the data is received;

generate a report, based on the processed data, indicative of a concentration level for each emitted gas and a concentration level of the particulate matter; and transmit an alert when the concentration level of one of the gases exceeds a predetermined gas level, or when the concentration level of the particulate matter exceeds a predetermined particulate matter level.

* * * * *